United States Patent
Faber et al.

(10) Patent No.: US 8,125,931 B2
(45) Date of Patent: Feb. 28, 2012

(54) SYSTEMS AND METHODS TO PROVIDE AVAILABILITY INDICATION

(75) Inventors: Scott Faber, San Francisco, CA (US); Ebbe Altberg, Mill Valley, CA (US); Ron Hirson, San Francisco, CA (US); Sean Van Der Linden, Berkeley, CA (US)

(73) Assignee: UTBK, Inc., Dover, DE (US)

( * ) Notice: Subject to any disclaimer, the term of this patent is extended or adjusted under 35 U.S.C. 154(b) by 906 days.

(21) Appl. No.: 11/329,459

(22) Filed: Jan. 10, 2006

(65) Prior Publication Data

US 2007/0161386 A1    Jul. 12, 2007

(51) Int. Cl.
    *H04L 12/16* (2006.01)
(52) U.S. Cl. ....................................................... 370/259
(58) Field of Classification Search .......... 370/351–352, 370/241, 252, 254–255, 259–261; 455/403, 455/414.1, 416, 418–419, 39, 500, 507–508; 379/201.01–201.04, 202.01–206.01, 210.01, 379/211.01, 900, 908, 914–915
See application file for complete search history.

(56) References Cited

U.S. PATENT DOCUMENTS

| | | | |
|---|---|---|---|
| 4,313,035 A | 1/1982 | Jordan et al. | |
| 4,577,065 A | 3/1986 | Frey et al. | |
| 4,631,428 A | 12/1986 | Grimes | |
| 4,645,873 A | 2/1987 | Chomet | |
| 4,677,434 A | 6/1987 | Fascenda | |
| 4,723,283 A | 2/1988 | Nagasawa et al. | |
| 4,741,025 A | 4/1988 | Maruyama et al. | |
| 4,751,669 A | 6/1988 | Sturgis et al. | |
| 4,752,675 A | 6/1988 | Zetmeir | |
| 4,796,293 A | 1/1989 | Blinken et al. | |
| 4,847,890 A | 7/1989 | Solomon et al. | |
| 5,058,152 A | 10/1991 | Solomom et al. | |
| 5,099,510 A | 3/1992 | Blinken, Jr. et al. | |
| 5,148,474 A | 9/1992 | Haralambopoulos et al. | |
| 5,155,743 A | 10/1992 | Jacobs | |
| 5,319,542 A | 6/1994 | King, Jr. et al. | |
| 5,325,424 A | 6/1994 | Grube | |
| 5,347,632 A | 9/1994 | Filepp et al. | |

(Continued)

FOREIGN PATENT DOCUMENTS

AU    699785    5/1995

(Continued)

OTHER PUBLICATIONS

Sterling, Greg, "Ingenio's Ether—Pay Per Professional Advice," Search Engine Journal, Mar. 3, 2006.

(Continued)

*Primary Examiner* — Derrick Ferris
*Assistant Examiner* — Omar Ghowrwal
(74) *Attorney, Agent, or Firm* — Greenberg Traurig, LLP

(57) ABSTRACT

Methods and apparatuses to provide services to people who wish to make connections for real time communication, such as live telephone conversation, chat, video conferencing, etc. In one embodiment, a method includes: an application receiving a representation of an object including a reference to a remote system and a callee; the application communicating with the remote system via the reference to the remote system and the callee to determine a rendering of the object; and the application rendering the object identifying a state of the callee for accepting a request for real time communication, the object selectable to at least initiate a request for real time communication with the callee.

23 Claims, 16 Drawing Sheets

U.S. PATENT DOCUMENTS

| | | |
|---|---|---|
| 5,359,508 A | 10/1994 | Rossides |
| 5,361,295 A | 11/1994 | Solomon et al. |
| 5,369,694 A | 11/1994 | Bales et al. |
| 5,373,549 A | 12/1994 | Bales et al. |
| 5,436,957 A | 7/1995 | McConnell |
| 5,448,625 A | 9/1995 | Lederman |
| 5,453,352 A | 9/1995 | Tachibana |
| 5,483,352 A | 1/1996 | Fukuyama et al. |
| 5,483,588 A | 1/1996 | Eaton et al. |
| 5,497,502 A | 3/1996 | Castille |
| 5,524,146 A | 6/1996 | Morrisey et al. |
| 5,537,314 A | 7/1996 | Kanter |
| 5,539,735 A | 7/1996 | Moskowitz |
| 5,539,813 A | 7/1996 | Jonsson |
| 5,544,237 A | 8/1996 | Bales et al. |
| 5,555,298 A | 9/1996 | Jonsson |
| 5,557,677 A | 9/1996 | Prytz |
| 5,559,875 A | 9/1996 | Bieselin et al. |
| 5,563,934 A | 10/1996 | Eda |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,608,786 A | 3/1997 | Gordon |
| 5,615,213 A | 3/1997 | Griefer |
| 5,619,148 A | 4/1997 | Guo |
| 5,619,555 A | 4/1997 | Fenton et al. |
| 5,619,570 A | 4/1997 | Tsutsui |
| 5,619,725 A | 4/1997 | Gordon |
| 5,619,991 A | 4/1997 | Sloane |
| 5,634,012 A | 5/1997 | Stefik et al. |
| 5,638,432 A | 6/1997 | Wille et al. |
| 5,644,715 A | 7/1997 | Baugher |
| 5,675,734 A | 10/1997 | Hair |
| 5,689,553 A | 11/1997 | Ahuja et al. |
| 5,694,549 A | 12/1997 | Carlin et al. |
| 5,701,419 A | 12/1997 | McConnell |
| 5,710,887 A | 1/1998 | Chelliah et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,734,961 A | 3/1998 | Castille |
| 5,740,231 A | 4/1998 | Cohn et al. |
| 5,740,549 A | 4/1998 | Reilly et al. |
| 5,745,681 A | 4/1998 | Levine et al. |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Petrecca et al. |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kanai et al. |
| 5,835,896 A | 11/1998 | Fisher et al. |
| 5,841,763 A | 11/1998 | Leondires et al. |
| 5,842,212 A | 11/1998 | Ballurio et al. |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,901,286 A | 5/1999 | Danknick et al. |
| 5,903,635 A | 5/1999 | Kaplan |
| 5,907,677 A | 5/1999 | Glenn et al. |
| 5,911,132 A | 6/1999 | Sloane |
| 5,914,951 A | 6/1999 | Bentley et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,944,790 A | 8/1999 | Levy |
| 5,946,646 A | 8/1999 | Schena et al. |
| 5,960,416 A | 9/1999 | Block |
| 5,974,141 A | 10/1999 | Saito |
| 5,974,398 A | 10/1999 | Hanson et al. |
| 5,982,863 A * | 11/1999 | Smiley et al. ............... 379/88.18 |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,999,609 A | 12/1999 | Nishimura |
| 5,999,611 A | 12/1999 | Tatchell et al. |
| 6,006,197 A | 12/1999 | d-Eon et al. |
| 6,011,794 A | 1/2000 | Mordowitz et al. |
| 6,014,644 A | 1/2000 | Erickson |
| 6,026,087 A | 2/2000 | Mirashrafi et al. |
| 6,026,148 A | 2/2000 | Dworkin et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardner et al. |
| 6,122,355 A | 9/2000 | Strohl |
| 6,130,933 A | 10/2000 | Miloslavsky |
| 6,131,085 A | 10/2000 | Rossides |
| 6,144,670 A | 11/2000 | Sponaugle et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,188,673 B1 | 2/2001 | Bauer et al. |
| 6,188,761 B1 | 2/2001 | Dickerman et al. |
| 6,192,050 B1 | 2/2001 | Stovall |
| 6,199,096 B1 | 3/2001 | Mirashrafi et al. |
| 6,212,192 B1 | 4/2001 | Mirashrafi et al. |
| 6,223,165 B1 | 4/2001 | Lauffer |
| 6,230,287 B1 | 5/2001 | Pinard et al. |
| 6,243,450 B1 | 6/2001 | Jansen et al. |
| 6,243,684 B1 | 6/2001 | Stuart et al. |
| 6,259,774 B1 | 7/2001 | Miloslavsky |
| 6,269,336 B1 | 7/2001 | Ladd et al. |
| 6,269,361 B1 | 7/2001 | Davis et al. |
| 6,292,799 B1 | 9/2001 | Peek et al. |
| 6,298,056 B1 | 10/2001 | Pendse |
| 6,301,342 B1 | 10/2001 | Ander et al. |
| 6,301,350 B1 | 10/2001 | Henningson et al. |
| 6,304,637 B1 | 10/2001 | Mirashrafi et al. |
| 6,310,941 B1 | 10/2001 | Crutcher et al. |
| 6,314,402 B1 | 11/2001 | Monaco et al. |
| 6,385,583 B1 | 5/2002 | Ladd et al. |
| 6,393,117 B1 | 5/2002 | Trell |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,418,202 B1 | 7/2002 | Caldwell et al. |
| 6,430,276 B1 | 8/2002 | Bouvier et al. |
| 6,434,527 B1 | 8/2002 | Horvitz |
| 6,463,136 B1 | 10/2002 | Malik |
| 6,470,079 B1 | 10/2002 | Benson |

| | | |
|---|---|---|
| 6,470,317 B1 | 10/2002 | Ladd et al. |
| 6,484,148 B1 | 11/2002 | Boyd |
| 6,493,324 B1* | 12/2002 | Truetken ............... 370/261 |
| 6,493,437 B1 | 12/2002 | Olshansky |
| 6,493,671 B1 | 12/2002 | Ladd et al. |
| 6,493,673 B1 | 12/2002 | Ladd et al. |
| 6,510,417 B1 | 1/2003 | Woods et al. |
| 6,523,010 B2 | 2/2003 | Lauffer |
| 6,529,878 B2 | 3/2003 | De Rafael et al. |
| 6,535,506 B1 | 3/2003 | Narain et al. |
| 6,539,359 B1 | 3/2003 | Ladd et al. |
| 6,546,087 B2 | 4/2003 | Shaffer et al. |
| 6,546,372 B2 | 4/2003 | Lauffer |
| 6,549,889 B2 | 4/2003 | Lauffer |
| 6,560,576 B1 | 5/2003 | Cohen et al. |
| 6,581,105 B2 | 6/2003 | Miloslavsky et al. |
| 6,606,376 B1 | 8/2003 | Trell |
| 6,625,595 B1 | 9/2003 | Anderson et al. |
| 6,636,590 B1 | 10/2003 | Jacob et al. |
| 6,658,389 B1 | 12/2003 | Alpdemir |
| 6,690,672 B1 | 2/2004 | Klein |
| 6,707,889 B1 | 3/2004 | Saylor et al. |
| 6,757,364 B2 | 6/2004 | Newkirk |
| 6,771,969 B1 | 8/2004 | Chinoy et al. |
| 6,807,423 B1 | 10/2004 | Armstrong et al. |
| 6,834,048 B1 | 12/2004 | Cho et al. |
| 6,836,225 B2 | 12/2004 | Lee et al. |
| 6,968,174 B1 | 11/2005 | Trandal et al. |
| 6,996,216 B2 | 2/2006 | Brown et al. |
| 7,013,001 B1 | 3/2006 | Felger et al. |
| 7,076,043 B2 | 7/2006 | Curbow et al. |
| 7,096,205 B2 | 8/2006 | Hansen et al. |
| 7,206,809 B2 | 4/2007 | Ludwig et al. |
| 7,245,707 B1 | 7/2007 | Chan |
| 7,249,066 B1 | 7/2007 | Krumroy et al. |
| 7,269,162 B1* | 9/2007 | Turner ............... 370/352 |
| 7,330,721 B2* | 2/2008 | Bhatia et al. ............ 455/422.1 |
| 7,720,091 B2 | 5/2010 | Faber et al. |
| 2001/0026609 A1 | 10/2001 | Weinstein et al. |
| 2001/0032247 A1* | 10/2001 | Kanaya |
| 2001/0036822 A1* | 11/2001 | Mead et al. |
| 2001/0037283 A1* | 11/2001 | Mullaney |
| 2001/0037292 A1* | 11/2001 | Vogt ............... 705/39 |
| 2001/0048737 A1 | 12/2001 | Goldberg et al. |
| 2002/0003867 A1 | 1/2002 | Rothschild et al. |
| 2002/0019846 A1 | 2/2002 | Miloslavsky et al. |
| 2002/0029241 A1 | 3/2002 | Yokono et al. |
| 2002/0038233 A1* | 3/2002 | Shubov et al. |
| 2002/0065959 A1 | 5/2002 | Kim et al. |
| 2002/0087565 A1 | 7/2002 | Hoekman et al. |
| 2002/0095331 A1 | 7/2002 | Osmar et al. |
| 2002/0107697 A1* | 8/2002 | Jensen |
| 2002/0120554 A1 | 8/2002 | Vega |
| 2002/0133571 A1 | 9/2002 | Jacob et al. |
| 2002/0141400 A1* | 10/2002 | DeMartino ............... 370/386 |
| 2002/0174133 A1* | 11/2002 | Sarukkai et al. ......... 707/104.1 |
| 2002/0178261 A1* | 11/2002 | Chang et al. ............ 709/225 |
| 2002/0191762 A1 | 12/2002 | Benson |
| 2002/0193094 A1 | 12/2002 | Lawless et al. |
| 2003/0043981 A1 | 3/2003 | Lurie et al. |
| 2003/0046161 A1 | 3/2003 | Kamanger et al. |
| 2003/0046231 A1 | 3/2003 | Wu |
| 2003/0063121 A1* | 4/2003 | Kumhyr et al. ............ 345/751 |
| 2003/0091028 A1 | 5/2003 | Chang et al. |
| 2003/0190907 A1 | 10/2003 | Smith |
| 2003/0220866 A1 | 11/2003 | Pisaris-Henderson |
| 2003/0223565 A1 | 12/2003 | Montemer |
| 2003/0225682 A1 | 12/2003 | Montemer |
| 2004/0006511 A1 | 1/2004 | Montemer |
| 2004/0010518 A1 | 1/2004 | Montemer |
| 2004/0023644 A1 | 2/2004 | Montemer |
| 2004/0096110 A1 | 5/2004 | Yogeshwar et al. |
| 2004/0148351 A1 | 7/2004 | Cotte |
| 2004/0162757 A1 | 8/2004 | Pisaris-Henderson |
| 2004/0204994 A1 | 10/2004 | Olson |
| 2004/0204997 A1 | 10/2004 | Blaser et al. |
| 2004/0234049 A1 | 11/2004 | Melideo |
| 2004/0234064 A1 | 11/2004 | Melideo |
| 2004/0236441 A1 | 11/2004 | Melideo |
| 2004/0254859 A1* | 12/2004 | Aslanian, Jr. |
| 2004/0258048 A1 | 12/2004 | Melideo |
| 2004/0260413 A1 | 12/2004 | Melideo |
| 2005/0010795 A1* | 1/2005 | Tagawa et al. |
| 2005/0021744 A1* | 1/2005 | Haitsuka et al. |
| 2005/0027669 A1* | 2/2005 | Day et al. ............... 707/1 |
| 2005/0038690 A1 | 2/2005 | Hayes-Roth |
| 2005/0048961 A1* | 3/2005 | Ribaudo et al. |
| 2005/0065811 A1* | 3/2005 | Chu et al. |
| 2005/0080878 A1* | 4/2005 | Cunningham et al. |
| 2005/0138564 A1* | 6/2005 | Fogg ............... 715/745 |
| 2005/0141439 A1* | 6/2005 | Hsu et al. ............... 370/259 |
| 2005/0203799 A1* | 9/2005 | Faber et al. |
| 2005/0209874 A1* | 9/2005 | Rossini |
| 2005/0220289 A1* | 10/2005 | Reding |
| 2006/0031516 A1 | 2/2006 | Kumer |
| 2006/0059159 A1* | 3/2006 | Truong et al. ............ 707/10 |
| 2006/0075104 A1* | 4/2006 | Kumer ............... 709/227 |
| 2006/0085281 A1 | 4/2006 | Hanai et al. |
| 2006/0095343 A1* | 5/2006 | Clark et al. |
| 2006/0123127 A1* | 6/2006 | Littlefield ............... 709/229 |
| 2006/0165051 A1* | 7/2006 | Banerjee et al. ........... 370/351 |
| 2006/0168510 A1 | 7/2006 | Bryar et al. |
| 2006/0182232 A1 | 8/2006 | Kerr et al. |
| 2006/0282503 A1* | 12/2006 | Gwozdz ............... 709/206 |
| 2007/0160076 A1 | 7/2007 | Faber et al. |
| 2007/0165841 A1 | 7/2007 | Faber et al. |
| 2007/0287488 A1 | 12/2007 | Faber et al. |
| 2007/0291783 A1 | 12/2007 | Faber et al. |
| 2008/0120378 A2* | 5/2008 | Smith ............... 709/206 |
| 2008/0175363 A1 | 7/2008 | Rodriguez et al. |

FOREIGN PATENT DOCUMENTS

| | | |
|---|---|---|
| EP | 1492318 | 12/2004 |
| GB | 2329046 A | 10/1999 |
| JP | 409233441 A | 9/1997 |
| JP | 409319812 A | 12/1997 |
| WO | WO 97/05733 | 2/1997 |
| WO | WO 98/02835 | 1/1998 |
| WO | WO 98/04061 | 1/1998 |
| WO | WO 98/13765 | 4/1998 |
| WO | WO 98/38558 | 9/1998 |
| WO | WO 02/44870 | 6/2002 |

OTHER PUBLICATIONS

International Application No. PCT/US06/44066, Written Opinion and International Search Report, Sep. 20, 2007.

USPTO Transaction History of U.S. Appl. No. 11/329,677, filed Jan. 10, 2006, entitled "Systems and Methods to Arrange Call Back."

USPTO Transaction History of U.S. Appl. No. 11/329,682, filed Jan. 10, 2006, entitled "Systems and Methods to Provide Guidance During a Process to Establish a Communication Connection."

USPTO Transaction History of U.S. Appl. No. 11/329,997, filed Jan. 10, 2006, entitled "Systems and Methods to Provide Bulk Communication Packages."

USPTO Transaction History of U.S. Appl. No. 11/692,739, filed Mar. 28, 2007, entitled "Systems and Methods to Connect Buyers and Sellers."

USPTO Transaction History of U.S. Appl. No. 11/692,743, filed Mar. 28, 2007, entitled "Systems and Methods to Provide Real Time Communication Connections."

Keen.com, http://web.archive.org/web/20040304111935/http://www.keen.com/, Mar. 4, 2004.

U.S. Appl. No. 09/596,466, filed Jun. 19, 2000, Agdeppa, Hector A.

U.S. Appl. No. 60/198,642, filed Apr. 20, 2000, Rothschild et al.

U.S. Appl. No. 60/471,535, filed May 19, 2003, Melideo.

PCT/US01/51181, Mar. 7, 2003.*

Abhaya Asthana and Paul Krzyzanowski, "A Small Domain Communications System for Personalized Shopping Assistance," Proceedings of ICPWC'94. Publication No. 0-7803-1996-6/94, IEEE, 1994, pp. 199-203.

Amir Herzberg, et al., "MiniPay: Charging Per Click on the Web," Computer Networks and ISDN Systems 29, (Sep. 1997) vol. 29, pp. 939-951.

Answers.com Web Page (www.answers.com).

"Applying Technology News," Accounting Technology, p. 14 (Feb./Mar. 1997).

Aspect Telecomm: Aspect Integrates the Web into the Call Center, M2 Presswire, Aug. 1996.

Barbara Jarvie, "Company Devoted to Hot-Line Support", Computer Reseller News, Oct. 21, 1991, p. 48.

Big Green Blog: Jan. 2005 Archives, Feb, 21, 2006.

Caring for Customers: Real-Time text chat and telephony provide personalized customer support and turn queries into sales leads, Internet World Media, Sep. 1999.

Chris Ott, "Making Good on the Information Economy". Denver Business Journal, Dec. 17, 1999, p. 27.

Christina Wood, "Hidden Cost of Tech Support", PC World, May 1995, pp. 143-152 & p. 156.

Collett, Stacey & Julie King, "Why Online Browsers Don't Become Buyers," Computerworld, vol. 33, No. 48, p. 14 (Nov. 1999).

"Connecting to On-Line Car Shoppers: Auto Sellers Use Netcall Internet Call-Button Technology to Turn Clicks into Interactive Sales", Business Wire, p. 4089., Jul. 1999.

Cynthia Hodgson, "Online Expert Databases & Services", Econtent, Dec. 1999, p. 48-53.

Davey, Tom, "Wheeling and Dealing Online", PC Week, vol. 13, No. 45, pp. 1, 129., Nov. 1996.

E.J. Addeo, A.B. Dayao, A.D. Gelman and V.F. Massa, "An Experimental Multi-Media Bridging System," Frontiers in Computer Communications Technology, Computer Communications Review, vol. 17, No. 5, Aug. 11-13, 1987, pp. 236-242.

Edith Herman, "US Courts to Launch First Federal 900 Service," Federal Computer Week, Sep. 28, 1992, p. 8.

Ellen Greenbalt, "Have you ever wondered . . . ", Datamation, Oct. 1997, p. 12.

EXP.com Web Site at www.exp.com/.

"Expertcity.com Launches Premier Online Marketplace for Expert Services," PR Newswire (Aug. 1999).

For Telesphere's Clients, Dial '1-900-TUF LUCK', Business Week Sep. 9, 1991, 88.

Franco Mercalli, et al., "TheESSAI Teleshopping System: An Example of Broadband Multimedia Application," Publication No. 0-7803-1820-X/94, IEEE, pp. 572-576 (1994).

Gregory Dalton, "Rent-An-Expert on the Web," Information Week p. 75 (Sep. 6, 1999).

Healey, Jon, "From A to Z, You Can Sell Advice Online." Retrieved from http://www.mercurycenter.com on Oct. 24, 2000, published on Nov. 7, 1999.

Infomarkets.com Web Site (www.informarkets.com).

Information about Expertcity.com retrieved from the Internet [http://www.expertcity.com] on Nov. 6, 2000.

Information about Expertcity.com retrieved from the Internet [URL:http://www.expertcity.com] on Apr. 9, 2000.

Information, Bid and Asked, Forbes, Aug. 20, 1990, 92.

Ingenio Press Archives for 2004, www.ingenio.com, Feb. 21, 2006.

Intellect Exchange Web Site (www.intelectexchange.com).

"Introducing 1-800-FREE411: First Nationwide Free Telephone Directory Assistance Service" Jingle Networks, Inc., Huntington Beach, Calif., Sep. 20, 2005.

ISDN Tutorial: Definitions, http://www.ralphb.net/ISDN/defs.html (Apr. 21, 2000).

ISDN Tutorial:Interfaces, http://www.ralphb.net/ISDN/ifaces.html, printed on Apr. 21, 2000.

J. Sairamesh, et al., "NetBazaar: Networked Electronic Markets for Trading Computation and Information Services", Research and Advanced Technology for Digital Libraries, Second European Conference. ECDL 1998, pp. 839-856 (Sep. 21-23, 1998).

J.W.R. Griffiths, et al., "Multimedia Communication in a Medical Environment", IEEE 1991 Singapore I.C. on Networks, p. 166 (8 pgs.).

"Jambo Launches to Connect People and businesses From the Internet to the Phone". Agoura Hills, Calif. May 3, 2005.

"Jambo Names Netzero Co-founder Stacy Haitsuka to New Post of Chief Information Officer", Agoura Hills, Calif., Jul. 5, 2005.

"Jambo Receives $5 Million in Financing from Kline Hawkes & Co., Westlake Venture Partners, Others", Agoura Hills, Calif., Oct. 17, 2005.

Jeff Pelline, "Net Firm to Connect Users by Phone," CNET News.com [retrieved from http://new.cnet.com] (Oct. 24, 2001) published Nov. 8, 1999.

Joann M. Wasik, "Information for Sale: Commercial Digital Reference and AskA Service", Virtual Reference Desk, Sep. 20, 1999, at www.vrc.org/AskA/commAskA.html.

John Robinson, "Attachmate Ready to Answer Net Questions", Network World, Apr. 8, 1996, p. 37.

Joseph Menn, "An Expert? There's Now a Home for You on the Internet", Los Angeles Times (retrieved from http://denverpost.com on Oct. 24, 2001).

*Keen.com, Inc.* v. *InfoRocket.com.Inc.*, Complaint for Patent Infringement. Trade Dress Infringement and Unfair Competition; Demand for Jury Trial filed Aug. 31, 2001, pp. 1-8 plus 17 pgs. of attachments.

*Keen.com, Inc.* v. *InfoRocket.com.Inc.*, Preliminary Injunction Hearing, pp. 286-289 (Jan. 8, 2002).

Keen.com Feb. 4, 2006.

Keen.com Plans Web Service Allowing Customers to Hold Private Phone Chats, Don Clark, Wall Street Journal, Nov. 8, 1999.

Keen.com raises $60 Million from Prestigious . . . Business Wire, Jan. 11, 2000.

"Keen.com™ Launches First Live Answer Community™, Connects People with Information to Share Over Their Standard Telephone", Press Release [retrieved from http://keen.com] (Oct. 24, 2000), published Nov. 8, 1999.

Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.

L. F. Ludwig and D. F. Dunn, "Laboratory for Emulation and Study of Integrated and Coordinated Media Communication," Conference on Office Communication Systems, Mar. 23-25, 1988, Sponsored by ACM SIGOIS and IEEECS TC-OA in cooperation with IFIP W.G. 8.4, pp. 283-291.

Linda Littleton, "Meet the Shadowy Future," Proceedings of ACM SIGUCCS User Services Conference XXII Ypsilanti, Michigan Oct. 16-19, 1994, pp. 205-210.

"Lucent Technology and Netscape Team to Deliver Lucent Ecommerce Solutions," Business Wire, Sep. 1998.

Masahiko Hase, Shuji Kawakubo and Mineo Snowman, "Advanced Videophone System Using Synchronized Video Filing Equipment," NTT Review, vol. 3, No. 4 Jul. 1991, pp. 29-36.

Michael Kanellos, "Do You Want to Know The Meaning of Life?", Computer Reseller News, Mar. 3, 1997, pp. 72-74.

Michael Rogers et al, "Experts Abound a: New Web Sites", Library Journal, Mar. 1, 2000, pp. 22-24.

"Netcall Internet Call Buttons Enhance E-Comrrerce Customer Service and Sales", PR Newswire. p. 7431., Aug. 1999.

PCT Search Report for PCT Application No. PCT/US01/48284, filed Oct. 30, 2001 (corresponding to U.S. Appl. No. 09/702,217) mailed May 13, 2002 (7 pgs.).

Qcircuit Web Site (www.qcircuit.com).

Richard A Kuehn, "The Voice of Technology," Credit World, pp. 20-23 (Jul. 1994).

Sell and buy advice online, The Ottawa Citizen, Nov 29, 1999.

"Surfbrains.com: Brains online save time & money", M2 Presswire, Jul. 11, 2000.

Tehrani, Rich, "e-Rip Van Winkle and the 60 Second Nap," Call Center Solution, vol. 18, No. 2, pp. 16(3)., Aug. 1999.

Telecommunications Buyers Guide and Directory, Editor & Publisher, pp. 29TC-38TC, Feb. 1994.

The Web Site at www.experts-exchange.com/.

The web-site at www.allexperts.com.

"TriNet's, Help Me, I'm Stuck, Internet Voice Button Services Pushes Web Pages to Online Users." Business Wire, Mar. 1998.

"USA Global Link Brings Interactively to Internet Shopping," Business Wire, Oct. 1998.

"UpSnap Selects LookSmart to Sell Premium Listings on FREE 411 Service for Text-Enabled Cell Phones", Nov. 4, 2004.

"Walker Digital Issued Landmark U.S. Patent No. 5,862,223 for Global Internet Marketplace for Experts", Business Wire, Jan. 26, 1999.

Welcome to the Electronic Emissary Project's WebCenter at www.tapr.org/emmisary/.

"Welcome to Jambo—the leader in Pay-per-Call Solutions" (search results) Oct. 17, 2005.

When Business Plan and Real World Clash, Wall Street Journal, Jun. 9, 1999, B1.

William H. Chimiak, et al, "Multimedia Collaborative Remote Consultation Tools Via Gigabit WAN In Teleradiology", IEEE 1994, Phoenix, p. 417 (7 pgs.).

* cited by examiner

Create Listing

Account　　Create Listing　　Get Button

Enter Listing Info

Listing Name: [                    ]

☐ Include Description (optional)

☑ Include Photo (optional)

Select a photo to be displayed to callers. Photo should be no larger than 70 pixels wide by 70 pixels high and should be in either GIF or JPEG format.

Step 1. Select a Photo file.

Photo File: [                    ] [ Browse... ] 

Step 2. Click "Upload Photo."

[ Upload Photo ]

Select Your Rate

Call Rate: $ [100.00] per [1] [Hour(s)]

Thereafter: ⊙ $ [50.00] per [30] [Minute(s)]
　　　　　　　○ End Call
　　　　　　　○ No Longer Charge

Enter Calling Info

This is the number we will call when a customer wishes to speak with you. Your callers will never see this number, and you can always update it.

Phone Number (U.S./Canada): ( [415] ) [861] - [6100]　Add ext.

International Callers

[ Continue ]

©2005 Ingenio, Inc. All Rights Reserved. | Trademark Notice | Privacy

FIG. 2

Start your call now

Your Telephone — ether *How this works* — Bill *More about me*

We're going to call Bill now and tell him that you would like to talk. We'll let him know that you're available to start a call sometime in the time window you select below.

Time Window: [4 Hours ▼]

Your Phone Number: ( [415] ) [731] - [0277]

- You will not be charged if we can not get a hold of this person.
- Your phone number is never revealed (More about security).

[ Call Now ]

🔒 SECURE SERVER

©2005 Ingenio, Inc. All Rights Reserved. | Trademark Notice | Privacy

FIG. 3

SYSTEMS AND METHODS TO PROVIDE AVAILABILITY INDICATION

TECHNOLOGY FIELD

At least some embodiments of the present invention relate to user interface techniques to assist people to connect for real-time communication, such as connecting people for telephonic conversation, chat, document sharing, screen-sharing, etc.

BACKGROUND

Internet, cellular communication systems, television, newspaper, etc., provide diverse communication media channels through which people may receive information and/or communicate with each other.

People may use a web site to chronologically publish personal thoughts and web links. Such a web site may be referred to as a blog. A blog may include content showing what is happening in the life of the person, collecting information on certain types of subjects of interest to the person, providing links to related web sites, etc. Thus, a personal web site may include a collection of contents that may be helpful to people of similar interest.

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet-switched network for a telephone connection. A packet switched network is typical in a computer data environment. Recent developments in the field of Voice over IP (VoIP) allow the delivery of voice information using the Internet Protocol, in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

BRIEF DESCRIPTION OF THE DRAWINGS

The present invention is illustrated by way of example and not limitation in the figures of the accompanying drawings in which like references indicate similar elements.

FIG. 2 illustrates a user interface to create a listing according to one embodiment of the present invention.

FIG. 3 illustrates a user interface to start a communication according to one embodiment of the present invention.

SUMMARY

Figure 1:
FIG. 1 illustrates a system according to one embodiment of the present invention.

Methods and apparatuses to provide services to people who wish to make connections for real time communication, such as live telephone conversation, chat, video conferencing, etc., are described herein. Some embodiments are summarized in this section.

A first embodiment, comprises: an application receiving a representation of an object including a reference to a remote system and a callee; the application communicating with the remote system via the reference to the remote system and the callee to determine a rendering of the object; and the application rendering the object identifying a state of the callee for accepting a request for real time communication, the object selectable to at least initiate a request for real time communication with the callee.

A second embodiment, comprises: maintaining a listing for offering to establish real time communications with a first entity, including: contact information of the first entity; a price for a first predetermined period of real time communication with the first entity; and at least one option provided by the first entity to continue beyond the first predetermined period of real time communication; and after purchasing a first session of the first predetermined period of real time communication, presenting the option to continue the first session beyond the first predetermined period of real time communication.

A third embodiment, comprises: presenting a graphic to guide a communicator through a connection process to establish a media connection between the communicator and a communicatee for real time communication; updating the graphic to provide an updated status of the connection process; and updating the graphic to instruct the communicator to take an action based on a current status of the connection process.

A fourth embodiment, comprises: receiving in a system a call back time window for a request from a first entity to establish a media connection for real time communication with a second entity, the call back time window being specified by the first entity to indicate a period of time including a current time during which the first entity is available for real time communication with the second entity; and attempting to establish the media connection between the first entity and the second entity according to the call back time window.

A fifth embodiment, comprises: responsive to a first request from a callee, providing a communication reference to the callee for distribution; and responsive to a second request from a caller indicating the communication reference, determining a current availability state of the callee for real time communication and providing information to the caller according to the current availability state of the callee.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description. References to one or an embodiment in the present disclosure can be, but not necessarily are, references to the same embodiment; and, such references mean at least one.

In one embodiment of the present invention, a system is to provide services to people who wish to make connections for real time communication, such as live telephone conversation, chat, video conferencing, instant messaging, and other forms of real time communications.

For example, benefits of the services may include anonymity for one or more of the parties of the real time communication. For example, the service can connect the caller and callee without revealing the contact information of one party to another, such as the actual telephone number. The services may include filtering callers/participants so that only those who are willing to pay can get connected. The services may include collecting payments for the callee so that the callee can earn money from talking to the callers over the phone without the burden of managing payment collection, etc. The services may include scheduling so that the real time communication are initiated at a convenient time (e.g., no night calls). The services may include queue managing to serve both the callees and the callers. The services may include providing the cool, convenient click-to-call functionality to attract callers for the callees.

In one embodiment, the services may include providing a persistent and consistent way to reach people. For example, a web link, or a toll-free number, or a local phone number can be provided by the system so that the callers can reach the callee using the web link, or the toll-free number, or the local phone number even after the telephone of the callee has been changed. The callee can publish the web link and/or the phone number, knowing that the calls will follow if the callee updates the telephone number in the system. The callees do not need to reveal their actual telephone numbers to the potential callers. If desired, the callee can keep the caller from knowing the actual telephone number of the callee for anonymity.

In general, the service may provide any combination of the benefits discussed above.

Many examples are presented in the context of telephone connection for real time conversation. Embodiments of the present invention can also be applied to other real time communication systems (e.g., text chat, instant messaging, voice/video conferencing, etc.) in a way similar to the telephone conversation.

FIG. 1 illustrates a system according to one embodiment of the present invention. As illustrated in FIG. 1, callees who have customers, fans, far-away clients, etc., can make money talking with them on the phone. The system provides the callees with services of managing the transactions such that the callees can sell what they have to say with reduced/minimum efforts on business aspects. For example, a blogger can earn money from the blog by talking to the interested readers of the blog.

In one embodiment, the callee can sign up for a call button of the system and/or for a phone number provided by the system. The call button and/or the assigned phone number can be used as the contact information of the callee. For example, the callee can publish the call button and/or the phone number in a variety of media channels and environments, such as in the blog, in advertisements, in news articles, in column discussions, in business cards, etc.

In one embodiment of the present invention, the callees manage their own distribution of the call button and/or the phone number, since the callees may have their unique ways to reach potential callers (e.g., through blogs, home pages, business cards, etc.). The callees can bring the call button and/or the phone number into the context where the customers of the callees are, such as their own web pages or blogs or business cards (e.g., via a phone number).

Alternative, or in combination, the system may also help the callees to reach callers through presenting the call buttons and/or the phone numbers in marketplaces, such as online listings of services, advertisements embedded in the search results generated by a search engine, classified advertisements, etc.

After signing up for the call button and/or the phone number, the callees can set up their own prices and their own hours for receiving the calls. When the call button and/or the phone number leads the callers to callees, the callees can earn money by talking to the callers without having to manage scheduling, queue, payment collection, privacy, etc. For example, the callees can enjoy the benefit of anonymity provided by the system, since the callees do not have to reveal their actual phone numbers to the potential callers in order to receive calls. The system provides the filtering functionality so that some callers can reach the callees.

In one embodiment of the present invention, the services of the system are packaged and delivered through the use of a call button and/or a communication reference (such as a phone number) assigned to the callee. The callees do not have to rely upon a marketplace, such as keen.com, to reach callers.

FIG. 2 illustrates a user interface to create a listing according to one embodiment of the present invention. In FIG. 2, the callee can specify the rate the callee will charge the callers when the callers want to talk to the callee.

In one embodiment, the callee may specify the price (rate) in terms of a package, such as $100 for one hour. A call package has a specified price for a given time limit that is longer than one minute (e.g., one hour). Alternatively, the callee may specify the price in terms of a price per unit of time, such as $2 per minute, without specifying a time limit.

In one embodiment, when the rate is specified as a package that includes a time limit (e.g., 60 minutes, two hours, etc.), the callee can further specify the policy for the continuation of the call beyond the time limit (e.g., $50 per 30 minutes thereafter, or end call, or no longer charge).

In the user interface illustrated in FIG. 2, the callee can specify the phone number (e.g., 415-861-6100) at which the system will call the callee when a customer wishes to speak to the callee. The phone number is used by the system to call the callee and make a connection to the customer. The phone number of the callee is not provided to callers (customers of the callee) for anonymity.

In one embodiment, the callee may specify a listing name (e.g., for this listing). The callee may create multiple listings with different rates, phone numbers, etc., in the same account. Optionally, the callee provide may further description and a photo (e.g., a photo of the callee) for the listing.

In one embodiment, the photo of the listing should be no larger than 70 pixel wide by 70 pixel high and should be in either GIF or JPEG format. Alternatively, the system may automatically convert the image uploaded from the callee into the appropriate size and format. However, it is understood that other sizes can also be used.

After the listing is created, the callee can select the button "Continue" to access the next screen for getting the call button.

In one embodiment, the web server of the system provides the callee with: a call button and/or a phone number, such as 1-800-GO-ETHER extension XXXX, after the callee finishes creating the listing. The call button and the phone number assigned to the callee are intended for the callee to place wherever a caller (buyer) will come across them.

For example, a golf pro provides great swing tips. The golf pro as a callee (seller) can put a call button on a blog, on a web page, in the footer of an email, etc. When people are reading the blog about golf equipment, they might think "I'm really interested in what this person has to say, I think I'll pay to talk to them live and ask them all my questions."

In one embodiment, the call button includes HTML (Hypertext Markup Language) code which contains a reference to the listing and one or more links to a server of the system. The HTML code can be inserted into the blog and/or the home page of the callee, or an email. When the HTML code is rendered in the browser of the caller (e.g., when the caller visits the blog or the home page of the callee, or when the caller views an email from the callee), the browser shows a call button which can be selected (e.g., through "clicking" on the call button using a cursor controlling device, such as a mouse, a track ball, a joystick, a touch screen, etc.) to request a phone connection. An example of the appearance of a call button includes an icon showing a telephone set and the text "call now", as illustrated in FIG. 1.

In one embodiment, when the call button is rendered, the appearance of the call button may include an icon, which when selected or activated can initiated a request for a real time communication connection.

Alternative, the call button can be specified in documents in a format other than HTML, such as in an extensible markup language (XML).

In one embodiment, the call button can change its state depending on the state of the caller and/or callee. For instance, if the callee is already on a phone call with a caller, the button would indicate "busy," so that a second caller would see that the callee is already on a telephone. Clicking on the button in this instance would give the second caller the ability to get in line to talk to the callee. Or, in another embodiment, the second caller clicking on the button could give him the ability to join the call in progress.

In one embodiment, the call button can change its state depending on what the callee explicitly indicates. The callee could, for instance, tell the system, via a web form or telephone IVR, that he is currently "taking calls" or "not taking calls" or "offering video" or "offering chat" or "taking appointments" or taking "arranged calls" or "callbacks." He could indicate that he is taking calls and is "by my phone," indicating a heightened presence. Depending upon each of such states, the system would lead callers down different communication paths. If a callee is "by my [his/her] phone," the system might call the caller first, since it's highly probably that the callee will be available for his/her side of the connection. If the callee is simply "taking calls," the system might call the callee first, since he/she might be the more unlikely party to be available. Other communication paths include getting in line, joining a conference call, turning on a video connection, scheduling an appointment, entering into a chat session, etc.

Similarly, the golf pro can use the phone number for various offline media and other media. For example, if the golf pro writes a column for Golf Digest magazine, he can put the phone number that is assigned to him (e.g., Ether phone number) at the end of the column, such as 1-800-GO-ETHER, extension XXXX. The system can even provide him with a custom 800 number, such as 1-800-GOLF-PRO, rather than the extension to a generic 1-800-GO-ETHER number. For example, the column may include the following message: "Call me to talk about your own golf swing. Dial 1-800-GOLF-PRO. $100/hour." Alternatively, the Ether phone number can be a phone number local to a specific region of interest to the golf pro (e.g., having the same area code, or the same area code and exchange, as those in the target geographical area).

In one embodiment, the callee may request a phone number, such as "1-800-GO-ETHER" extension "YOU", which is specifically assigned to the callee (and/or the listing). The callee can publish the assigned phone number in the blog, home page, printed publications, brochure, or business card. The phone number may be given out during a TV or radio talk show, etc. When the assigned phone number is called, the call is first connected to a server of the system. The system can then call the callee and join the caller and the callee for real time communication.

FIG. 3 illustrates a user interface to start a communication according to one embodiment of the present invention. For example, after a caller selects a call button, the user interface as illustrated in FIG. 3 is displayed (e.g., in the browser of the caller, or in a pop-up window).

In the example of FIG. 3, a call graphic is displayed to show the progress of making the connection. In FIG. 3, the photo of the callee (e.g., the photo uploaded by the callee to the server for the listing during the creation of the listing) is displayed with a link "More about me", which when selected causes the browser to display the description of the listing corresponding to the call button.

In one embodiment, when the photo of the listing is not available, the system may present a standard icon to represent the callee.

In FIG. 3, an icon and the description "Your Telephone" are displayed to present the caller. An "ether" icon between the caller and callee represents the system. The link "How this works" under the "ether" icon can be selected to see the details of the call process, which can be helpful to a user who is not familiar with the system.

The user interface presents an entry to receive a time window (e.g., 4 hours) within which the caller is available to take a call back from the system to talk to the callee. The user interface also includes an entry to receive the phone number of the caller such that the system can call back the caller to make the connection between the caller and the callee in this time window.

In one embodiment, the user interface can be part of the VoIP client application (e.g., the user interface of a VoIP terminal, such as the user interface of a VoIP-enable phone, or an application window of a VoIP application running on a computer or a Personal Digital Assistant (PDA)). The VoIP phone connection can be established, whether the user inputs the callback phone number or if the VoIP connection simply connects the two parties without the need of a phone number.

In FIG. 3, the user interface includes a button "call now" which when selected causes the user interface to send the time window and the callback phone number to a server to request for a phone connection.

In one embodiment, the user interface is part of the VoIP client application which can send the telephonic contact information (e.g., the phone number of the VoIP client application or a user ID of the VoIP system) to the server without the user explicitly specifying the call back number.

Figure 4:
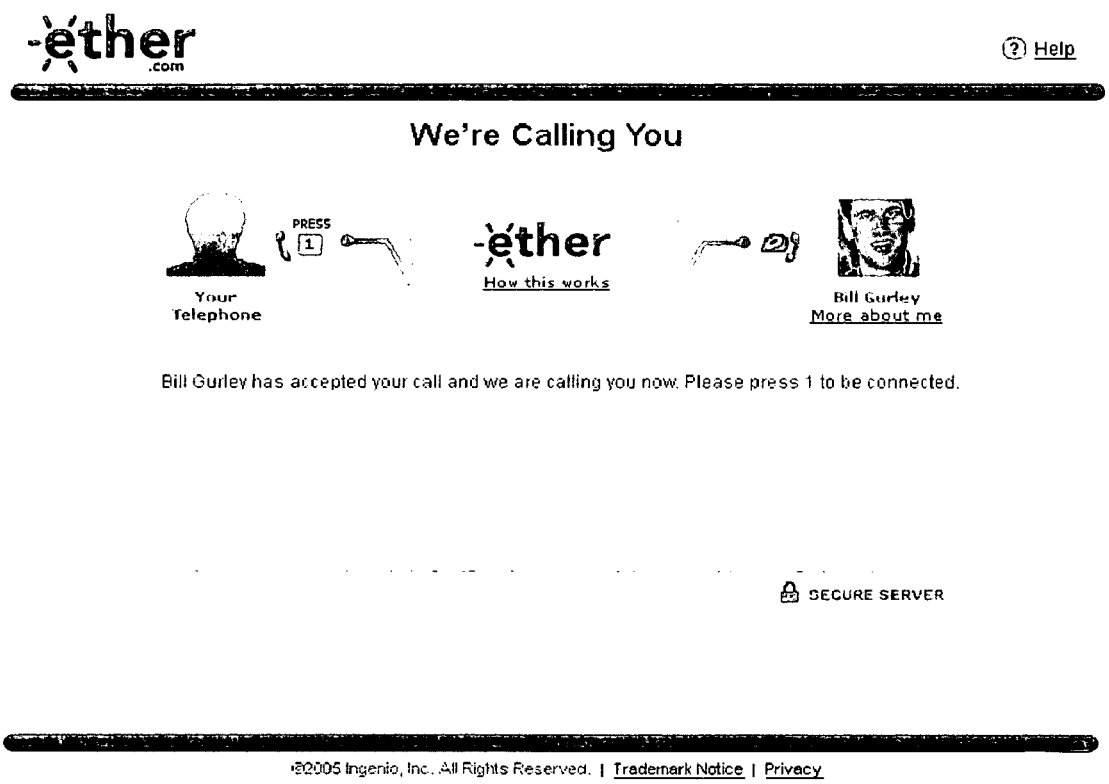
FIG. 4 illustrates a user interface to display the status of a communication connection process and to provide the user guidance through the process according to one embodiment of the present invention.

FIG. 4 illustrates a user interface to display the status of a communication connection process and to provide the user guidance through the process according to one embodiment of the present invention.

In FIG. 4, the call graphic shows that the phone of the callee is off the hook, indicating that the callee has accept the call. The call graphic shows the icon "Press 1" to instruct the caller to press "1" on the phone to be connected to the callee.

The user interface further provides text explaining the status and instruction to the caller.

In one embodiment, before the callee accepts the call, the system calls the callee, during which the call graphic shows that the phone of the callee is ringing and the phone of the caller is on the hook, not yet answered by the callee. The text is provided in the user interface to explain the current status of the connection process and to instruct the user to wait while the system is contacting the callee.

Thus, in one embodiment, the system provides the user-friendly, step-by-step feedback and instruction to the caller to guide the caller through the connection process.

In one embodiment, after the connection between the caller and callee is established, the system further provides feedback and instructions on the call graphic. For example, during the call the system can provide the accumulated call time for the purchased call. If the purchased call has a time limit, the call graphic can further show the remaining minutes of the call. When the time limit is approaching (or reached), the call graphic can provide the guidance and instructions for "recharge" (e.g., by purchasing a further package, or switching to a per minute mode with a further time limit, etc.). In one embodiment, the options to continue the call when the time limit is approaching (or reached) is displayed in the graphical user interface so that the caller may select an option in the graphical user interface without interrupting the conversation with the callee.

In one embodiment, if a purchased call with a time limit is interrupted/dropped before the time limit is reached, the caller can continue the call by requesting a re-connection with a time window. To help the caller, the call graphic can present the guidance and instructions for continue the call and present the status of the continuation of the call. For example, the call graphic may present a description of the continuation policy for interrupted/dropped call and show the remaining portion of the time window to resume the call.

One example scenario of using a call button that is placed in the blog, home page, or email of the callee(seller) is described below.

When the callee (seller) is taking calls, the call button of the callee (seller) says "Call Me."

When the caller (buyer) clicks on the button, the caller (buyer) is led to a landing page that explains how the service works and indicates the price, which might be $100 to talk on the phone for 60 minutes and $1 per minute thereafter.

When the caller (buyer) clicks the "Continue" button on the landing page, the caller (buyer) is brought to a page to specify payment options (e.g., credit card information). Or, if the caller (buyer) is a returning member, the caller (buyer) can sign in (e.g., through providing the correct member name and password) to instruct the system to use the billing information (e.g., credit card and billing address) that is already on file (e.g., that has been previously submitted to the system and that is stored in the database of the system in association with account of the caller). If the caller (buyer) is not a member, the caller (buyer) is presented with a page to register with the system and become a member. Alternatively, the caller (buyer) may specify the payment information without becoming a member.

For example, the page may identify the caller (buyer) as a member according to the information provided by a cookie maintained by the web browser of the caller (buyer). If the cookie exists, the cookie includes the member name of the caller (buyer). If the cookie indicates that the caller (buyer) has already signed in, the server may skip the sign-in process; otherwise, the caller (buyer) is prompt to sign in. If the caller (buyer) is new to the network, the caller (buyer) is asked to register and become a member.

In one embodiment of the present invention, the call button/link does not bring the caller (buyer) inside the marketplace (e.g., a list showing competitors). Instead, the actions related to the call button happen in the environment of the callee (seller). For example, the web page(s) can be just a pop-up window so that the caller does not have to leave the web page (e.g., blog or home page) of the callee (seller). The landing page may be within a frame of the blog/home page of the callee, or within an applet embedded in the blog/home page of the callee.

Alternatively, the call button may bring the caller (buyer) to a VoIP application and provide the guidance and instruction to the caller on the user interface of the VoIP application.

In one embodiment, the VoIP application has browser functionality and shows the call button with the blog, web page or email in the user interface of the VoIP application.

Alternatively, the call button may bring the caller (buyer) to the marketplace which shows the offers of the competitors of the callee (seller).

In one embodiment, after confirming the payment information, the caller (buyer) is led to a page to specify the phone number that the caller (buyer) would like to be called back at and the time window within which the caller (buyer) is willing to receive the call back to talk to the callee (seller). The time window might be "four hours." FIG. 3 shows an example of such a page.

When the caller (buyer) continues (e.g., pressing the button "Call Now" in FIG. 3), the system obtains the authorization to charge an amount, when the call is connected (e.g., $100 from the buyer's credit card, if the credit card is the method of payment).

In one embodiment, a call for a package of bulk minutes (e.g., that has a specified time limit) is charged when the two parties are connected, regardless of whether the duration of the time limit is reached. In one embodiment, to avoid the difficulty in charging the buyer (e.g., $100) to talk to a seller but the seller fails to call back within the time window requested by the buyer, the system does not charge the buyer until after a connection between the caller (buyer) and the callee (seller) is successfully established (e.g., for a minimum period of time, or after the phone call is completed, or after the time limit is reached, etc.).

In one embodiment, the system "pre-authorizes" the charge (e.g., $100) on the buyer's credit card to make sure that, should the connection be completed, the buyer would be able to pay. In one embodiment, the system indicates the status of pre-authorization, charging/not-charging to the buyer in the user interface that guides the user through the process of making the connection.

Alternatively, the system may make the charge (e.g., $100) on the buyer's credit card when starting to make the connection and make a refund to the buyer if the connection is not successful within the call back time window specified by the caller (buyer). Alternatively, the system may charge a portion of the fee (e.g., $100) during the phone connection set up period, and refund the charge if the connection is not successful or charge the remaining portion after the connection is made successfully (e.g., after the phone call is completed).

In one embodiment, the system determines whether or not to pre-charge the buyer based on statistical data, such as the credit history of the caller (buyer), the success rate of the callee (seller) to call back within the time window specified by the caller (buyer), etc. Thus, for example, if the system determines that the call is likely to be established within the time window, the system may pre-charge the caller; for example, if the system determines that the caller (buyer) has a good credit history, the system may defer the charge to a later stage (e.g., after the completion of the call).

In one embodiment, after the system determines that the caller(buyer) has a sufficient source to pay for the call, the system calls the callee (seller) and says: "We have a caller who is calling you on your call button. He is paying your $100 fee and is willing to wait up to 4 hours to talk to you. Please press 1 on your telephone keypad if you want to take the call now; press 2 if you can't take it now but can indeed take it within the next 4 hours that has been requested, or press 3 if you won't be able to take it within 4 hours." Note that different system may associate different sets of key pressing events (e.g., press 1, press 2, press 3, . . . ) with different options.

In one embodiment, the system can optionally provide the callee (seller) with more information about the caller (buyer) based on pre-recorded information. For example, the system can record the self introduction of the caller (buyer) (e.g., the name of the caller, for instance 'Bob') so that the system tells the callee "We have 'Bob' . . . " instead of "We have a caller . . . ", where 'Bob' is the recording of the self-introduction of the callee (buyer).

In one embodiment, the system has the name of caller (buyer) recorded as part of the member preference/attribute of the caller (buyer). Alternatively, the system can use a text-to-speech program to "read out" the name of the buyer when introducing the call to the callee (seller). Alternatively, the system can record the name of the caller (buyer) when the system receives a call from the caller at the phone number assigned to the callee, or callback the caller first to obtain the recording.

In one embodiment, if the callee (seller) presses 1, the system tells the callee (seller) to hold on while the system calls the caller (buyer). The screen of the caller (buyer) is updated automatically to indicate that the callee (seller) is ready and the caller (buyer) is being called back for the connection between the caller (buyer) and the callee (seller).

If the callee (seller) presses 2, the system tells the caller (buyer) (e.g., on the screen of the caller) that the callee (seller) can't take the call now but expect to take the call within an identified period of time (e.g., the next 4 hours). The system will arrange to make the phone connection within the identified period of time (e.g., the next 4 hours).

In one embodiment, the system may use alternative numbers to indicate a response of the callee.

For example, the system may send a message (e.g., through email, a web-based user interface for the callee (seller), a voice mail, an instant message, etc) to the callee about the call and the identified period of time (e.g., 4-hour time window) so that the callee (seller) may indicate to the system within the identified period of time (e.g., next 4 hours) that the callee (seller) is ready for the call.

Alternatively, the system may try to call the callee (seller) periodically or according to a time period specified by the callee (seller). For example, the callee may press 15 after pressing 2 to indicate that system should try to make the connection after 15 minutes. Alternatively, the callee may provide such an indication through replying to the email, instant message, short text message, or through a network-based user interface (e.g., web-based) that is designed to manage the user account. For example, the network-based user interface may present a list of calls in the queue and the corresponding time windows. When ready to take the next phone call, the callee can indicate to the system that the callee is currently available to take a call (or a particular one of the calls in the list).

Alternatively, the caller (buyer) may try to call the callee (seller) again within the time window (e.g., next 4 hours).

In one embodiment, the system may monitor the activities related to this call to avoid duplicated efforts in making the connection within the time window (e.g., next 4 hours) so that the caller and callee are not interrupted by unnecessary attempts to make the connection.

If the callee (seller) presses 3, the system tells the caller (buyer) that the callee (seller) can't take the call within the requested time window. The caller (buyer) in this case is not charged the price (e.g., $100). In one embodiment, the caller (buyer) is charged the price (e.g., $100) only when the call between the caller (buyer) and callee (seller) is actually connected.

When the system makes the connection between the caller (buyer) and callee (seller), the system may call the caller (buyer) first or call the callee (seller) first, or call both at about the same time. For example, the system may determine which one of the caller and callee is more reliable and call the reliable one of the two first. The system may determine which of the parties is more reliable based on statistic data collected from past call connection activities. Alternatively, the system may connect to the less reliable party first. Alternatively, the callee (seller) may specify the preference of who is to be called first as part of the specification of the listing.

When the caller (buyer) calls the phone number assigned to the callee (assignee) (e.g., 800-GO-ETHER extension 4567), the system may first authenticate the caller and/or arrange the payment options and then prompt the caller to enter the time window and the call back phone number using the key pad of the phone. An interactive voice response (IVR) system can be used to interact with the caller so that the caller does not need web access to be connect to the callee (seller).

Alternatively, the system may determine automatically the telephone contact information of the caller from the call received from the caller (buyer) (e.g., through call ID service or an Automatic Number Identification (ANI) service) and use the telephone contact information in calling back. The system may present an option for the caller (buyer) to confirm the automatically detected telephone contact information of the caller for calling back so that the caller has an opportunity to specify different telephone contact information for the call back.

In one embodiment, when the system determines that the caller has a graphical user interface (e.g., web access) while requesting the connection for the call (e.g., when the caller pushes a button on a web interface to request the call, or when the caller is signed into the system or when the online presence of the caller is detected, or when the call is initiated from a VoIP terminal that has a graphics capability), the system uses the graphical user interface to assist the caller. When the system fails to detect the online presence of the caller, the system uses the IVR system to provide the caller (buyer) with guidance. Thus, the system automatically switches between using the web interface to guide the caller or using the IRV interface to guide the caller.

In one embodiment, the system may further use other communication systems to guide the callee (e.g., according to the presence and availability of such communication systems). For example, the interface may be Wireless Application Protocol based (WAP-based) applications, or based on instant messaging, or based on a custom designed client-server application/protocol. Thus, a web-based interface is presented as an example. User interfaces based on other communication protocols and/or other types of communication systems can also be used.

In one embodiment, the system may ask the caller (buyer) to hang up temporarily until the callee accepts the call. Alternatively, the system may allow the caller (buyer) to stay on the line while the system attempt to reach the callee (seller).

In one embodiment, the system allows the callee (seller) to specify one or more alternative phone numbers in case the callee (seller) is not reachable at the primary phone number specified for the listing. Similarly, the caller (buyer) may also specify one or more alternative call back phone numbers. In one embodiment, the system allows the parties to specify other telephonic references (e.g., user names of Internet telephonic application) to make the telephone connection. In one embodiment, the system may further allow the user to specify other identities to make connections for other types of real time communications, such as chat, instant messaging, video conferencing, etc.

In one embodiment, the system arranges the call according to aspects of the methods described in the U.S. Patent Application Publication No. 2004/0252820 (application Ser. No. 10/360,776, filed on Jun. 12, 2003), which is hereby incorporated herein by reference.

When the caller (buyer) requests the connection using the call button, the web server provides the instructions and feedback to guide the caller (buyer) through the call process.

When the caller (buyer) dials the callee's listing via the Ether phone number (e.g., the 800 number assigned to the callee), an interactive voice response (IVR) system is used to provide similar instructions and feedback to guide the caller (buyer) through the call process.

For example, the caller (buyer) registers and creates an identity using the phone number and a PIN. A credit card is asked for via IVR or live operator to set up payment options. Then the call window is entered on the keypad of the phone, such as pressing the string of keys "4*" to indicate a "4" hours window or "60#" for a "60" minutes window.

In one embodiment, when the callee is having a telephonic connection with the system, the system prompts the caller (buyer) to utter a message for the callee (seller). For example, the caller (buyer) may say "I'm Bob Stanley—remember we met at the golf conference last weekend." The system records the messages of the caller (buyer). When the callee (seller) gets the call, the system says, "There's a buyer on the line who's paid $100 and is willing to wait 4 hours and here's how he identifies himself: 'I'm Bob Stanley—remember we met at the golf conference last weekend." The system in such a way provides as much identifying information to the callee (seller) as possible so that the callee (seller) may screen the callers for acceptance. In one embodiment, the system behaves as an automatic secretary, screening who's on the line for the callee (seller).

In one embodiment, the system provides functionality for bulk-minute pricing.

For example, once a call starts, the system metes out the time that has been bought. When the time limit, for example, 60 minutes, is up, the system tells both parties on the phone that the time is up. The system then prompts the buyer to add more money to buy a second package, or go to per minute pricing, or end the call, or let them talk further for free, according to the continuation policy of the call which is specified by the callee (seller) in the listing (e.g., specified during the creation of the listing).

In one embodiment, if the parties hang up after just, for example, 35, minutes of a 60-minute call, the system has a time window in which it expires the remaining minutes. The time window can be set quite large, such as a year, so that someone can buy a 1,000-minute discount package and talk 100 times over the course of the year. Or the time window can be set small, such as 30 minutes, in which case the caller (buyers) can call again within the 30-minute window after the 35-minute call to keep talking based on the already purchased 60-minute package, but the caller (buyers) can be connected on the basis of the unused portion of the 60-minute call package after a break that is longer than the time window.

In one embodiment, the system time window specifies the longest period of break before the unused portion of the purchased package expires.

In one embodiment, the system time window specifies the period from the starting of the conversation and the time when the purchased package expires. For example, the system may specify a window of 4 hours or so by default, so that people who get cut off or interrupted can finish their calls in this window of time.

In one embodiment, the system time window is based on the size of the purchased package. The larger the time limit of the package, the larger is the time window. In one embodiment, the expiration of the package is based on a limit on the separate calls (e.g., three). In one embodiment, the expiration of the package is based on the expiration time window and the limit on separate calls, whichever is reached first.

In one embodiment, the system allows the callee (seller) to specify the expiration time window in the specification of the listing (e.g., as part of the continuation policy of the call package) and/or the limit on the separate calls.

FIGS. 5-12 show examples of flow diagrams of a process to connect a user and an adviser for telephonic conversation according to one embodiment of the present invention.

In one embodiment, when a caller selects (e.g., clicks) on a call button according to one embodiment of the present invention, the selection (e.g., click) leads down several different paths depending on the availability status of the seller.

Figure 5:
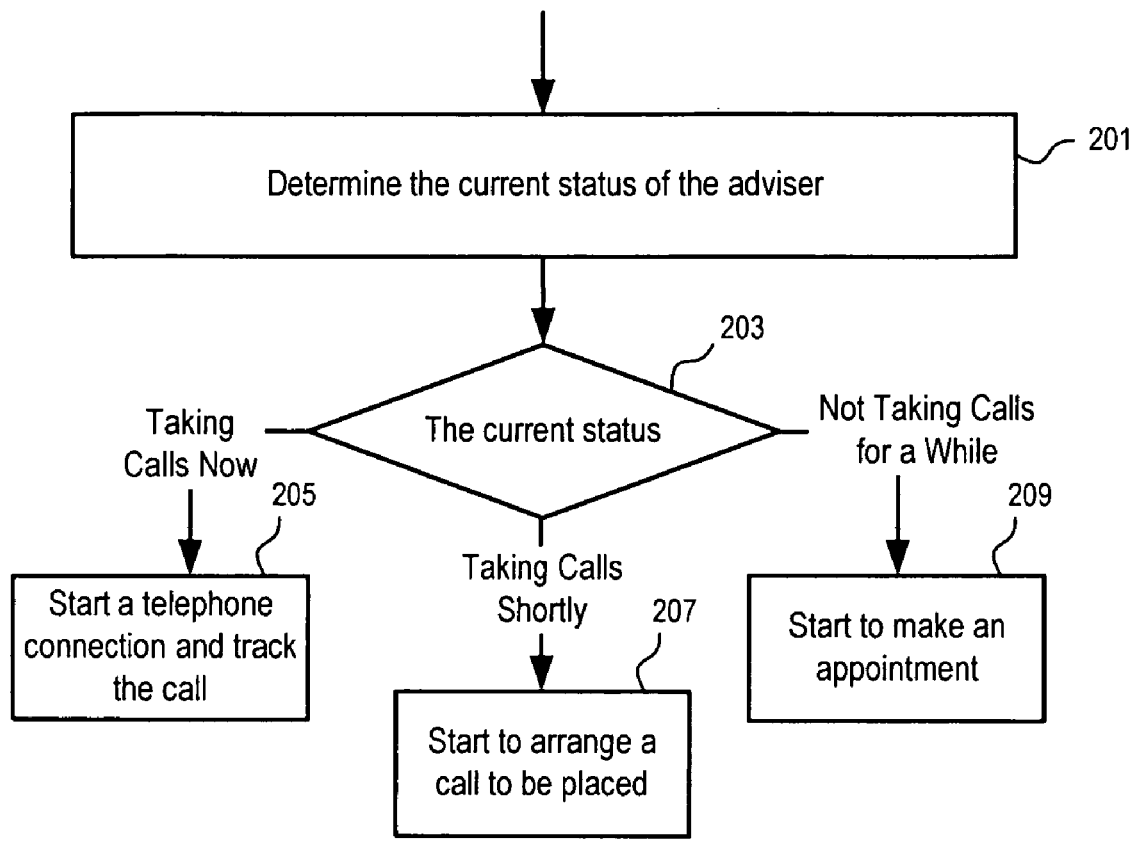
FIGS. 5-12 show examples of flow diagrams of a process to connect a user and an adviser for communication according to one embodiment of the present invention.

For example, in FIG. 5, the system determines (201) the current status of the adviser at the time the telephonic connection is started. In one embodiment, the current status of the adviser is determined based at least partially on the information provided by the adviser. For example, the adviser can specify the scheduled hours of the day during which the adviser is expected to take calls; the adviser may select a button (e.g., push through placing a cursor over the button on a display of a graphical user interface and activating a selecting device, such as a key or a button of a cursor positioning device such as a mouse or a touch pad or a joystick, etc.) on a web page, or make a phone call to the system, to indicate whether the adviser is currently busy and not answering new calls and/or to further specify the estimated duration of the busy period. The adviser may select a button on a user interface (e.g., a web page designed for the manage of the listing and/or account of the adviser) to indicate that the adviser is now free and ready to take calls. The adviser may pick up the phone call from the system and indicate to the system the current status of the adviser. The adviser may transmit the current status information to the system using instant messages, email, SMS messages, etc.

If the current status (203) of the adviser is "Taking Calls Now" or something equivalent, the system starts (e.g., immediately) a telephone connection and tracks the call (205).

If the current status (203) of the adviser is "Taking Calls Shortly", the system starts (207) to arrange the call to be placed within the time period specified by the caller without trying to call the adviser immediately, since the adviser is temporary busy and will be available to take calls within a short period of time.

If the current status (203) of the adviser is "Not Taking Calls for a While" or something equivalent, the system starts (209) to make an appointment for the user to call the adviser, since the adviser is not available to take the call and will not be available for a longer period of time.

Figure 6:
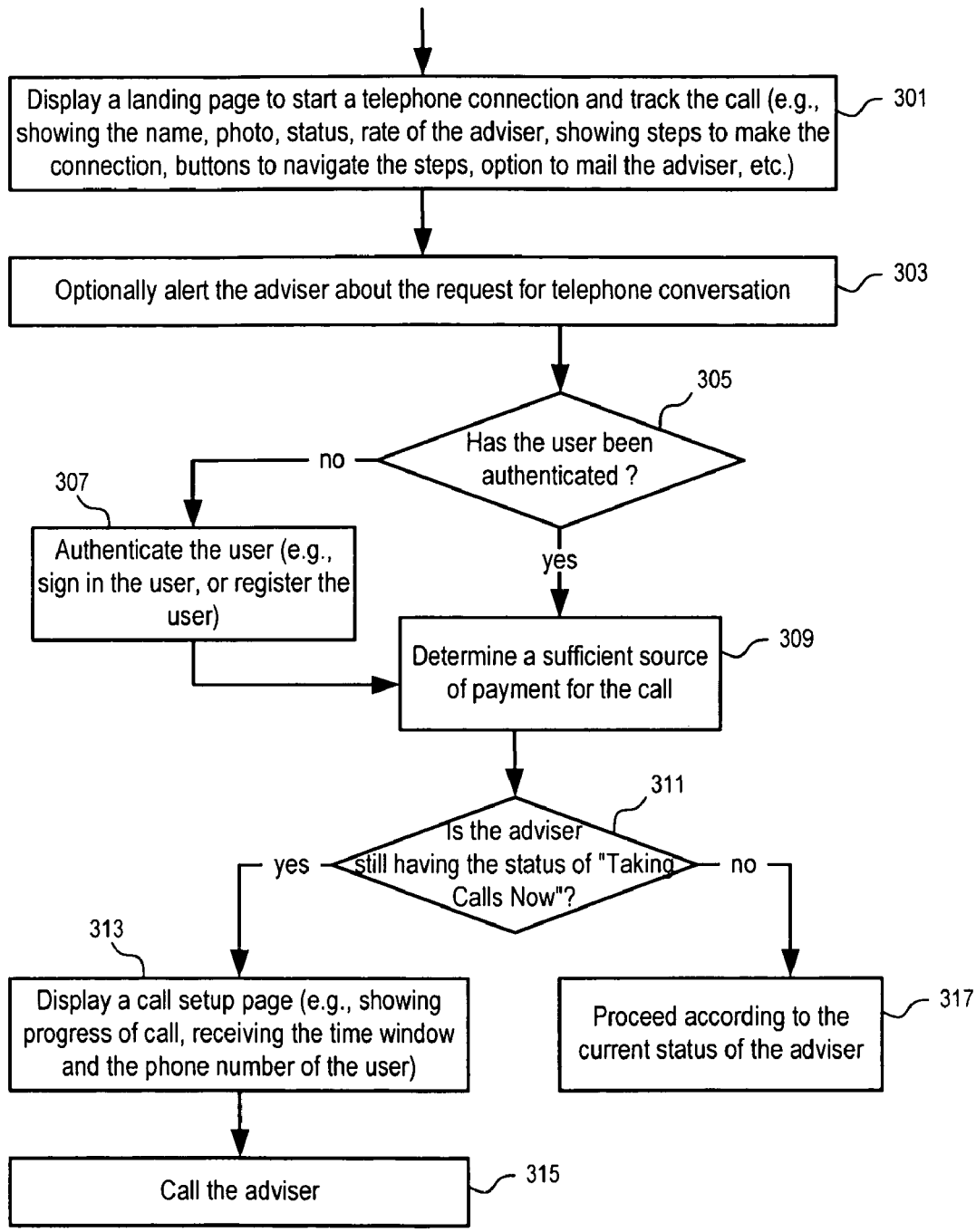

In FIG. 6, when the system starts to at least initiate a telephone connection (e.g., in response to a request from a selected call button), the system displays (301) a landing page to at least initiate a telephone connection and track the call. For example, the web server of the system transmits information defining the landing page to the web browser of the user to show the landing page (e.g., in a pop-up window).

For example, the landing page may show the name, photo, status, rate of the adviser, show/explain the process to make the connection, buttons to navigate the process, option to mail the adviser, etc.

Optionally, the system alerts (303) the adviser about the request for telephone conversation (e.g., through a web-based user interface, or through email, instant messaging, short text message, etc.)

The system determines whether the user has been authenticated (305). If the user has not been authenticated, the system authenticates (307) the user. For example, the system signs in the user if the user is already a member, or registers the user as a new member if the user is not yet a member.

The system then determines (309) a source of payment for the call.

After the system has identified a source of payment for the call based on the price for the call specified by the adviser in the listing, the system may further determine if the adviser is still having the status of "Taking Calls Now". In certain instances, the process of authenticating the user and securing the source of payment may take an extended period of time such that the availability status of the adviser may have changed.

If the adviser is no longer available for immediate connection, the system proceeds (317) according to the current status of the adviser, based on whether the current status is "Taking Calls Shortly" or "Not Taking Calls for a While".

If the adviser is still available for immediate connection, the system displays (313) a call setup page. The call setup page may show the progress of call and user interface elements to receive the time window and the phone number of the user (caller).

Once the time window within which the user (caller) is available for the call and the call back phone number of the user is received, the system calls (315) the adviser.

Figure 7:
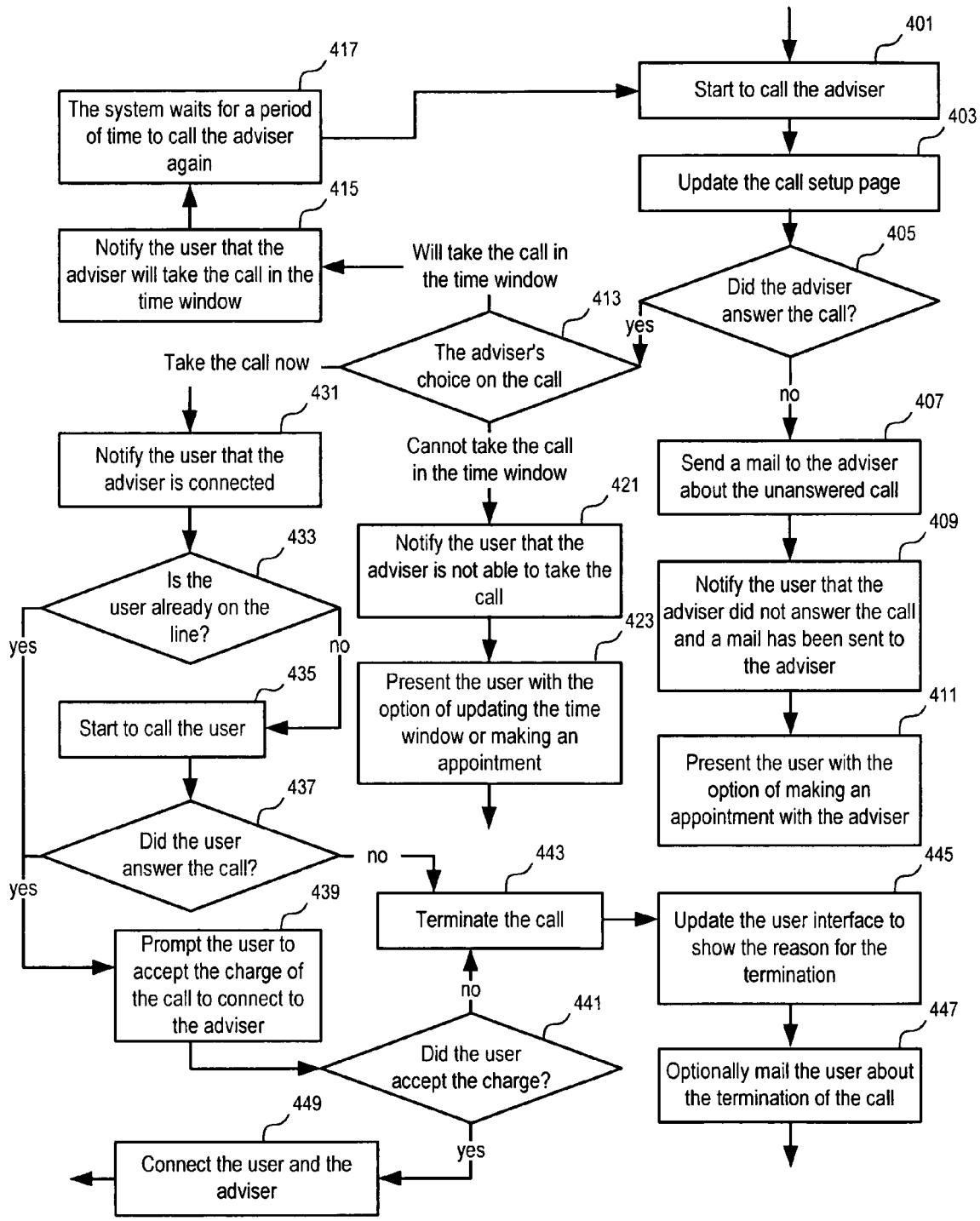

In FIG. 7, after the system starts (401) to call the adviser, the system updates (403) the call setup page. For example, the system may play an animation and/or sound clip and/or a text message to indicate that the system is calling the adviser, in one embodiment.

Then, the system determines whether or not the adviser answered the call (405).

If the adviser failed to answer the call, the system sends (407) a mail to the adviser about the unanswered call. The system notifies (409) the user that the adviser did not answer the call and a mail has been sent to the adviser. The system then presents (411) the user with the option of making an appointment with the adviser.

If the adviser answered the call, the system obtains the adviser's choice (413) on the call.

The adviser may indicate that the adviser will take the call in the time window specified by the caller, in which case, the system notifies (415) the user that the adviser will take the call in the time window. Then, the system waits (417) for a period of time to call the adviser again. Alternatively, the system may try the connection based on an indication from the adviser that the adviser is ready to take the call (e.g., by calling the system, selecting a button or a link on a web page in the account of the adviser, sending an email/instant message/short text message to the system or replying to a message from the system about the call, etc.)

The adviser may indicate that the adviser cannot take the call in the time window specified by the caller, in which case, the system notifies (421) the user (caller) that the adviser is not able to take the call and presents (423) the user with the options of updating the time window and making an appointment.

The adviser may indicate that the adviser wants to take the call now, in which case, the system notifies (421) the user that the adviser is connected and the server is now calling the user (at which point of the process, the caller may or may not one the phone). The system then determines if the user is already on the line (433).

If the user is not already on the line, the system starts (435) to call the user and determines whether the user answered the call (437).

If the user did not answer the call back, the system terminates (443) the call (443) and the adviser is notified.

After the user answers the call back, the user is on one line and the adviser on another line. The system then prompts (439) the user to accept the charge of the call before connection to the adviser and determines whether the user accepts the charge (441).

If the user accepts the charge, the system connects (449) the user to the adviser (e.g., by joining the calls) and starts to monitor aspects of the call (e.g., duration) and charge the user.

If the user rejects the charge or fails to provide a response within a predetermined period of time, the system terminates (443) call. After the termination of the call, the system updates (445) the user interface to show the reason for the termination. Optionally, the system mails (447) the user about the termination of the call.

Figure 8:
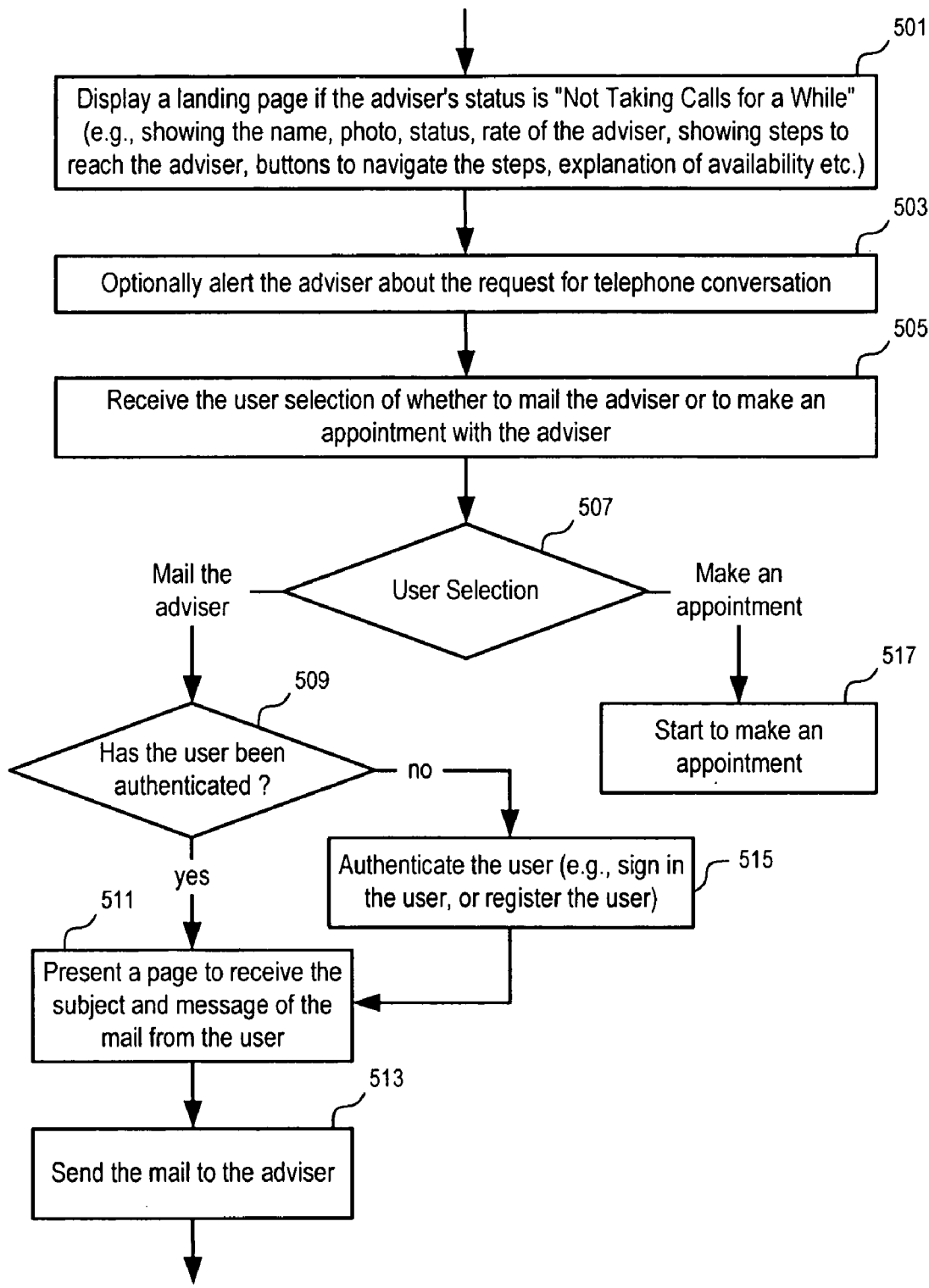

In FIG. 8, the system displays (501) a landing page, if the adviser's status is "Not Taking Calls for a While". The landing page may show the name, photo, status, rate of the adviser, and show the process to reach the adviser, buttons to navigate the process, explanation of availability, etc.

Optionally, the system alerts (503) the adviser about the request for telephone conversation.

In one embodiment, the system receives (505) from the landing page the user selection whether to mail (e.g., email or use other types of messaging systems) the adviser or to make an appointment with the adviser.

If the user selection (507) is to mail the adviser, the system determines if the user has been authenticated (509). If the user has not been authenticate, the system authenticates (515) the user. For example, if there is no cookie in the web browser of the user indicating that the user is currently in a valid session, the user may be presented with an interface to sign in or to register.

If the authenticated user chooses to mail the adviser, the system presents (511) a page to receive the subject and message of the mail from the user. After receiving the subject and message of the mail, the system sends (513) the mail to the adviser (without showing the mailing address of the adviser to the user and without showing the mailing address of the user to the adviser) in accordance with one embodiment.

In one embodiment, the mail is delivered electronically (e.g., through an email, instant message, SMS message, web mail). Alternatively, the mail may be delivered as voice mail, print out, etc.

If the user selection (507) is to make an appointment, the system starts (517) to make an appointment.

Figure 9:
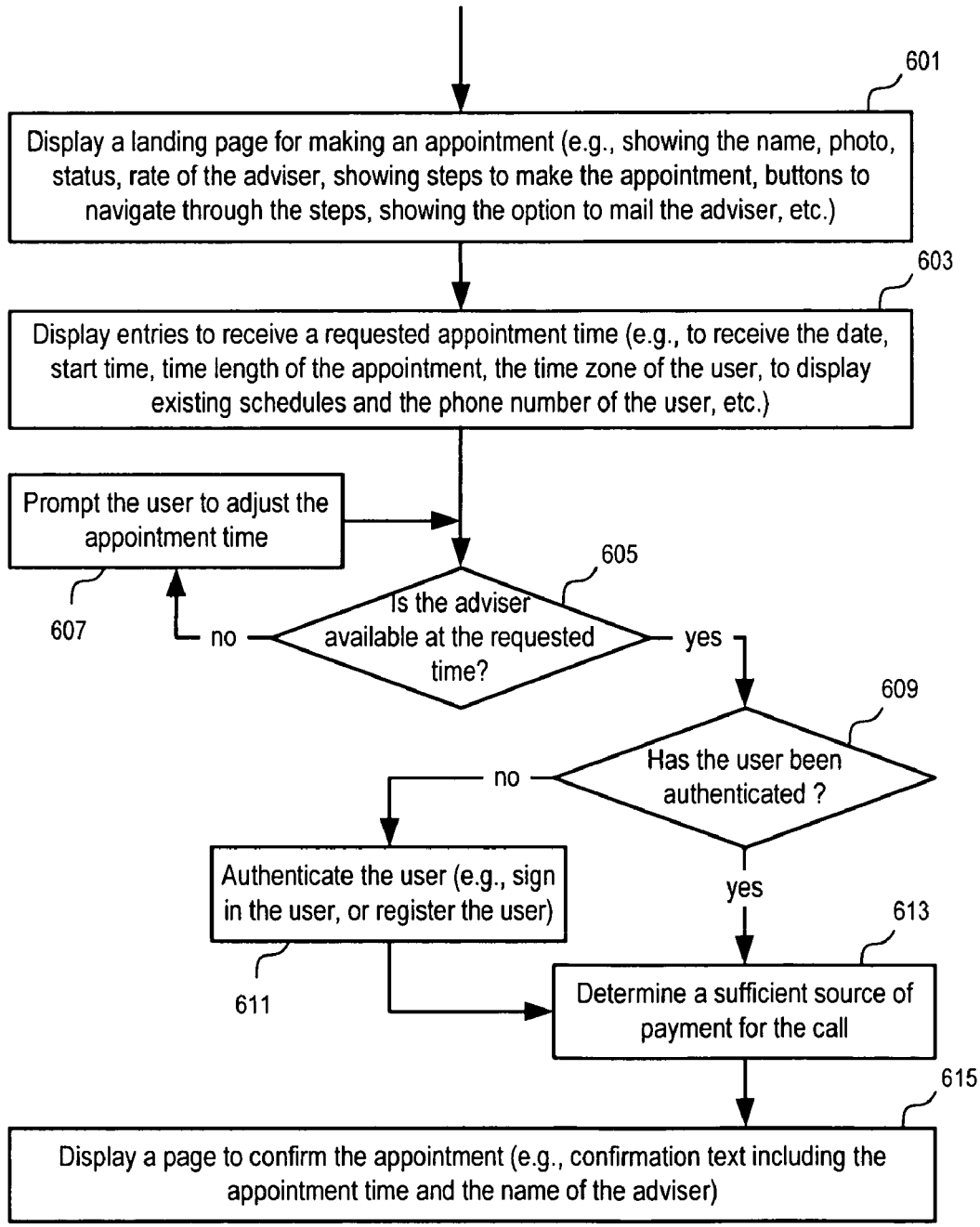

In FIG. 9, the system displays (601) a landing page for making an appointment. The landing page may display one or more of the name, photo, status, rate of the adviser, and show stages of operations to make the appointment, buttons to navigate through the stages of operations, show the option to mail the adviser, etc.

The system displays (603) entries to receive a requested appointment time. The entries can be part of the landing page or a page displayed after a navigation button is selected. In one embodiment, the entries are used to receive one or more of the date, start time, time length of the appointment, the time zone of the user, etc.

In one embodiment, the system further displays existing schedules and the phone number of the user, etc. for the convenience of the user (e.g., if the user is already authenticated at this point of the process).

After the requested time of the appointment is received from the user, the system determines if the adviser is available at the requested time (605). If the adviser is not available at the requested time, the system prompts (607) the user to adjust the appointment time; otherwise, the system proceeds to the task of filtering the callers.

If the system determines that the user has not been authenticated (609), the system authenticates (611) the user through signing in the user or registering the user. The system then determines (613) if a sufficient source of payment for the call is available from the user.

If there is a sufficient source of payment for the call, the system accepts the appointment and displays (615) a page to confirm the appointment. The confirmation page may show confirmation text including the appointment time and the name of the adviser.

In one embodiment, after the appointment is made, the system automatically starts to make connections to the caller and the callee separately at the requested time of the appointment. Alternatively, the system may reserve a time slot on the schedule of the callee on behalf of the caller and request the caller to make a request for a connection at the scheduled time. Alternatively, the system may request the adviser (callee) to make the request for the connection. For example, the system may determine a less reliable one of the two to make a request for the connection, or contacting the less reliable one first, during the appointment time is reached before starting to contact the other party.

Figure 10:
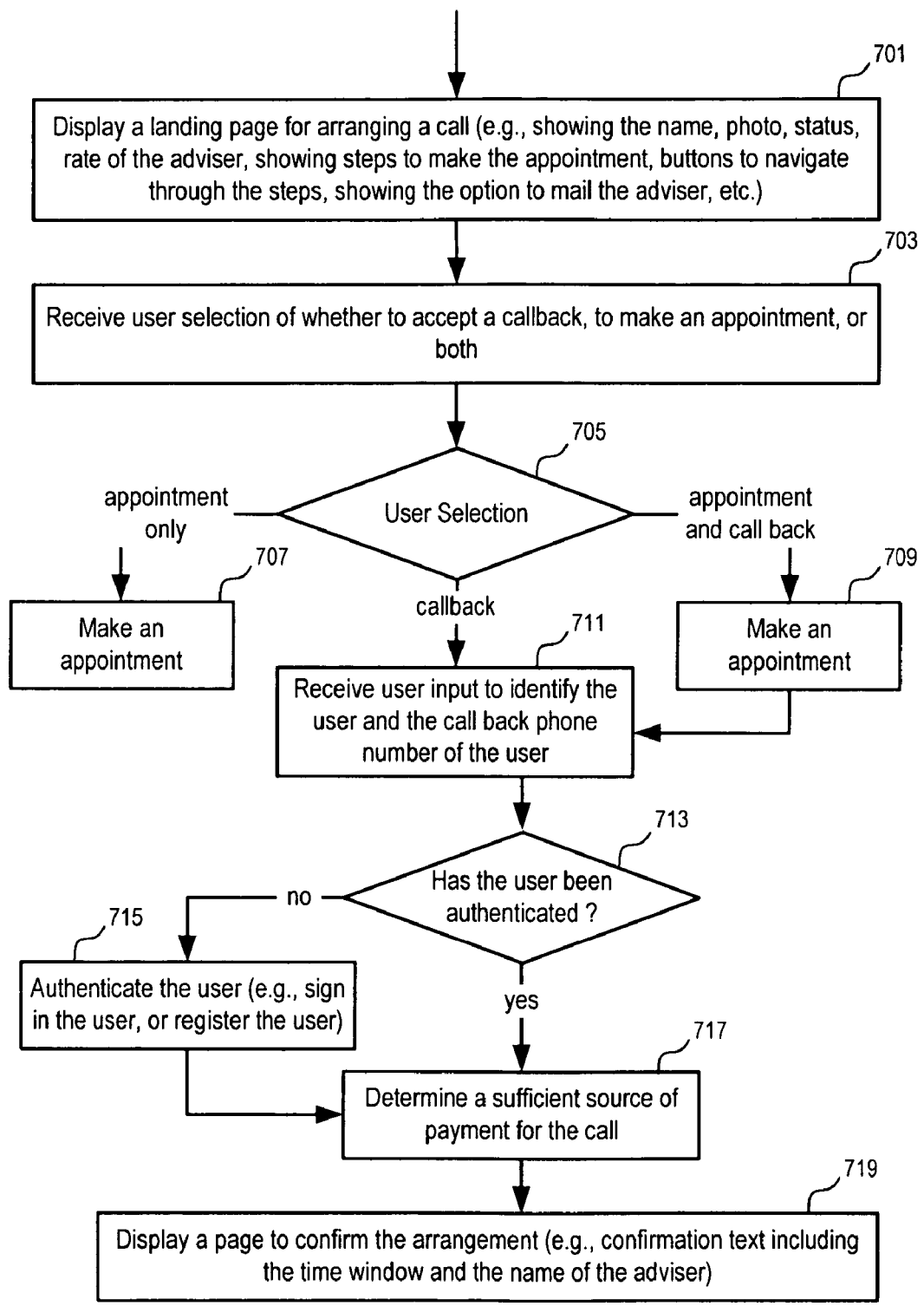

In FIG. 10, the system displays (601) a landing page for arranging a call. The landing page may display one or more of the name, photo, status, rate of the adviser, show stages of operations to make the appointment, buttons to navigate through the stages, show the option to mail the adviser.

The system receives (703) a user selection of whether to accept a callback, to make an appointment, or both.

If the user selection includes making an appointment, operation 707 or operation 709 is performed to set up an appointment (e.g., according to the process illustrated in FIG. 9).

If the user selection includes accepting a callback, the system receives (711) user input to identify the user and the call back phone number of the user and determines whether the user has been authenticated (713). If the user has not yet been authenticated, the system authenticates (715) the user (e.g., through signing in the user or registering the user).

After the user is authenticated, the system determines (717) if a sufficient source of payment for the call is available (e.g., to filter out non-serious callers). The system then displays a page to confirm the arrangement (e.g., confirmation text including the time window and the name of the adviser).

Figure 11:
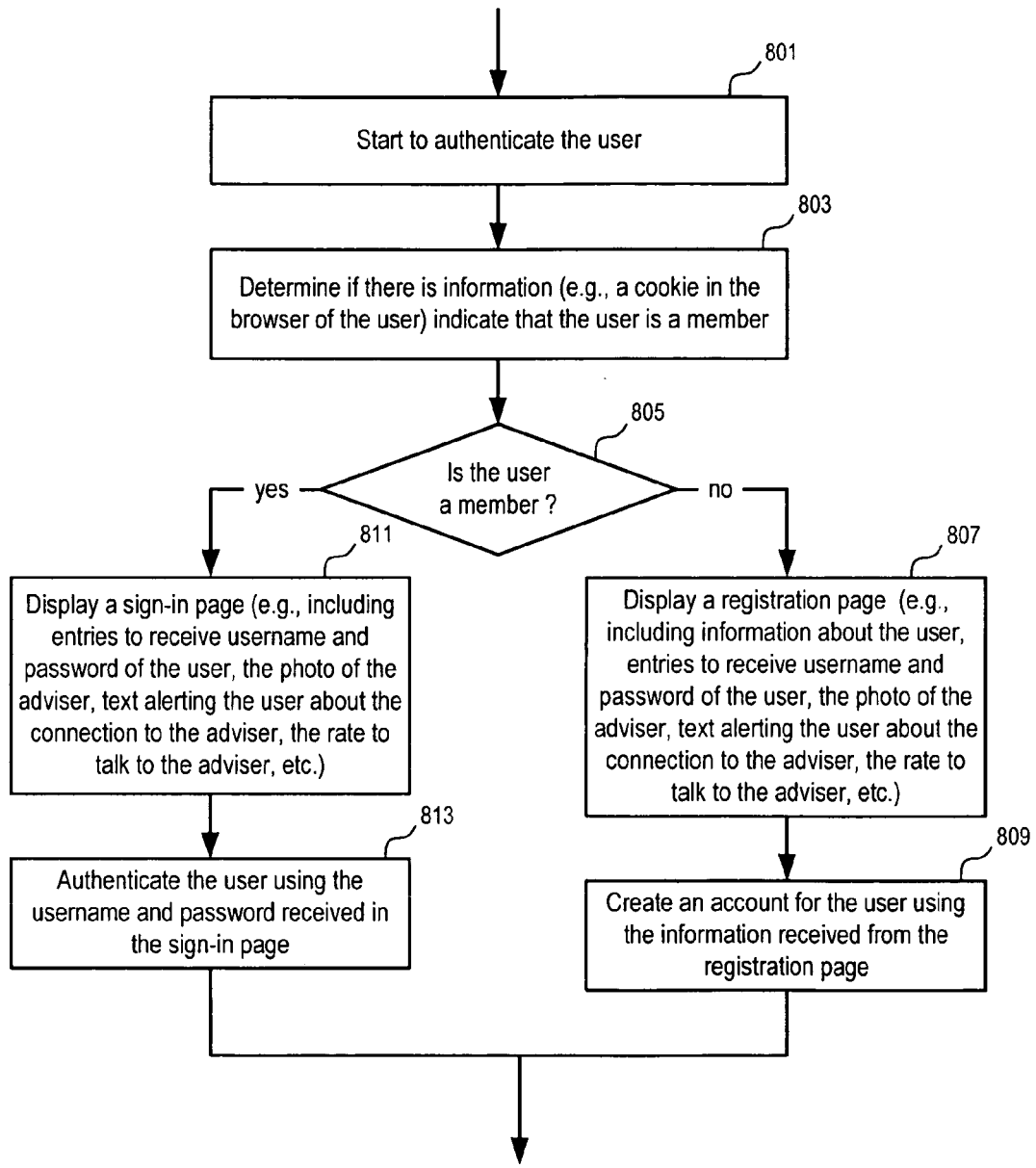

FIG. 11 shows an example to authenticate the user. In FIG. 11, after the system starts (801) to authenticate the user, the system determines (803) if there is information to indicate that the user is a member. The information may be in a cookie in the browser of the user, or a parameter encoded in an URL (universal resource locator) of a link, or a parameter in an applet running in the web browser.

If the user is a member (805), the system displays (811) a sign-in page which may include entries to receive a username and a password from the user. In one embodiment, the sign-in page may optionally further include the photo of the adviser, text alerting the user about the connection to the adviser, the rate to talk to the adviser, etc. Thus, the sign-in appears to be in the environment of the adviser. The system then authenticates (813) the user using the username and password received in the sign-in page.

If the user is not a member (805), the system displays (807) a registration page. The registration page may include information already collected about the user (e.g., during the interaction before the registration) for confirmation purpose. The registration page includes entries to receive username and password of the user. In one embodiment, the registration page may optionally further include the photo of the adviser, text alerting the user about the connection to the adviser, the rate to talk to the adviser, etc. Thus, the registration appears to be in the environment of the adviser. The system then creates (809) an account for the user using the information received from the registration page.

In one embodiment, after the user is authenticated, information is created to indicate that the user is authenticated for a valid session (e.g., using a cookie, a parameter in URL or in an applet) until the session expires or the user signs off.

Figure 12:
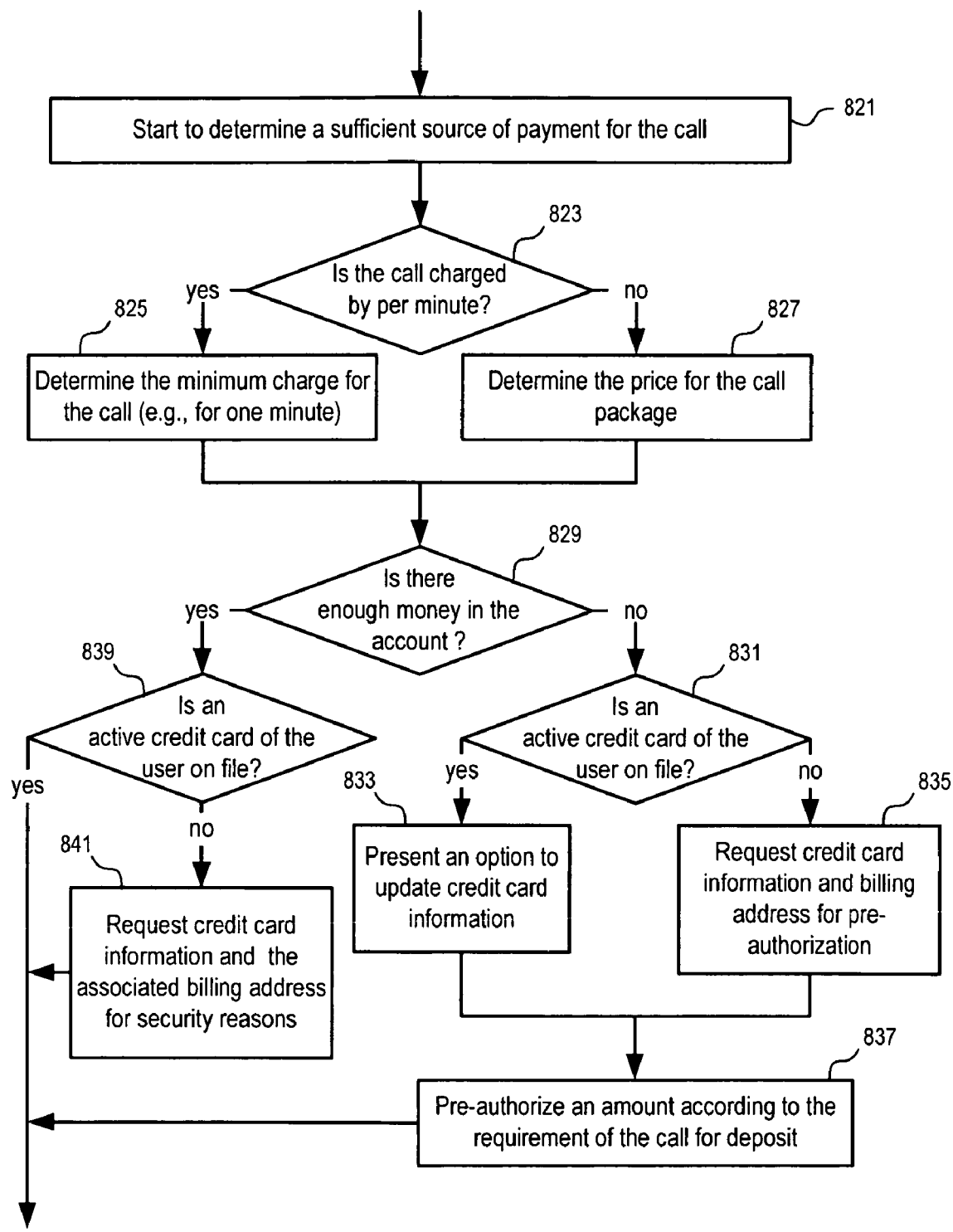

FIG. 12 shows an example to determine if a sufficient source of payment of the call is available.

After the system starts (821) to determine if a sufficient source of payment for the call is available, the system determines (823) whether the call is charged by per interval (e.g., per minute). If the call is charged by per interval, the system determines (825) the minimum charge for the call (e.g., for one minute). If the call is not charged by per interval, the system determines (827) the price for a call package (e.g., $100 for 1 hour, as specified by the adviser).

The system then determines whether there is enough money in the account of the user (829) and/or whether there is an active credit card of the user is on file (839 and 831).

If the account of the user has enough money for the call and/or an active credit card of the user is not on file, the system optionally requests (841) for the credit card information and the associated billing address for security reason.

If the account of the user does not have enough money for the call, the system will pre-authorize (837) an amount according the requirement of the call for deposit purpose. If an active credit card of the user is on file, the system optionally presents (833) an option to update the credit card information. If no active credit card of the user is on file, the system requests (835) credit card information and billing address for pre-authorization.

In one embodiment, when information identifying the user is available (e.g., through a "cookie" implemented in the web browser or parameters encoded in the URL, or parameters stored in the variables of an applet running in the web browser, etc.), the system uses the information about the user to help the user. For example, from the member information database, the system may retrieve the phone numbers of the user. If there are multiple phone numbers for the user, a combo box is displayed for the user to select one from the known phone numbers of the user (or to type in a different one). If there is only one known phone number of the user, the system may display the known phone number of the user in an entry box as the default value.

If a user as identified by the information (e.g., cookie) is different from the current user, the current user can choose to edit the information and/or sign in as a different user.

In one embodiment, a user can enter the input information to set up a call, such as the call window and/or the callback phone number before the user is authenticated. When the user is subsequently authenticated (e.g., through signing in as an existing member or registering as a new member), the information provided by the user before the authentication process is used to update the account information (if changed).

Figure 13:
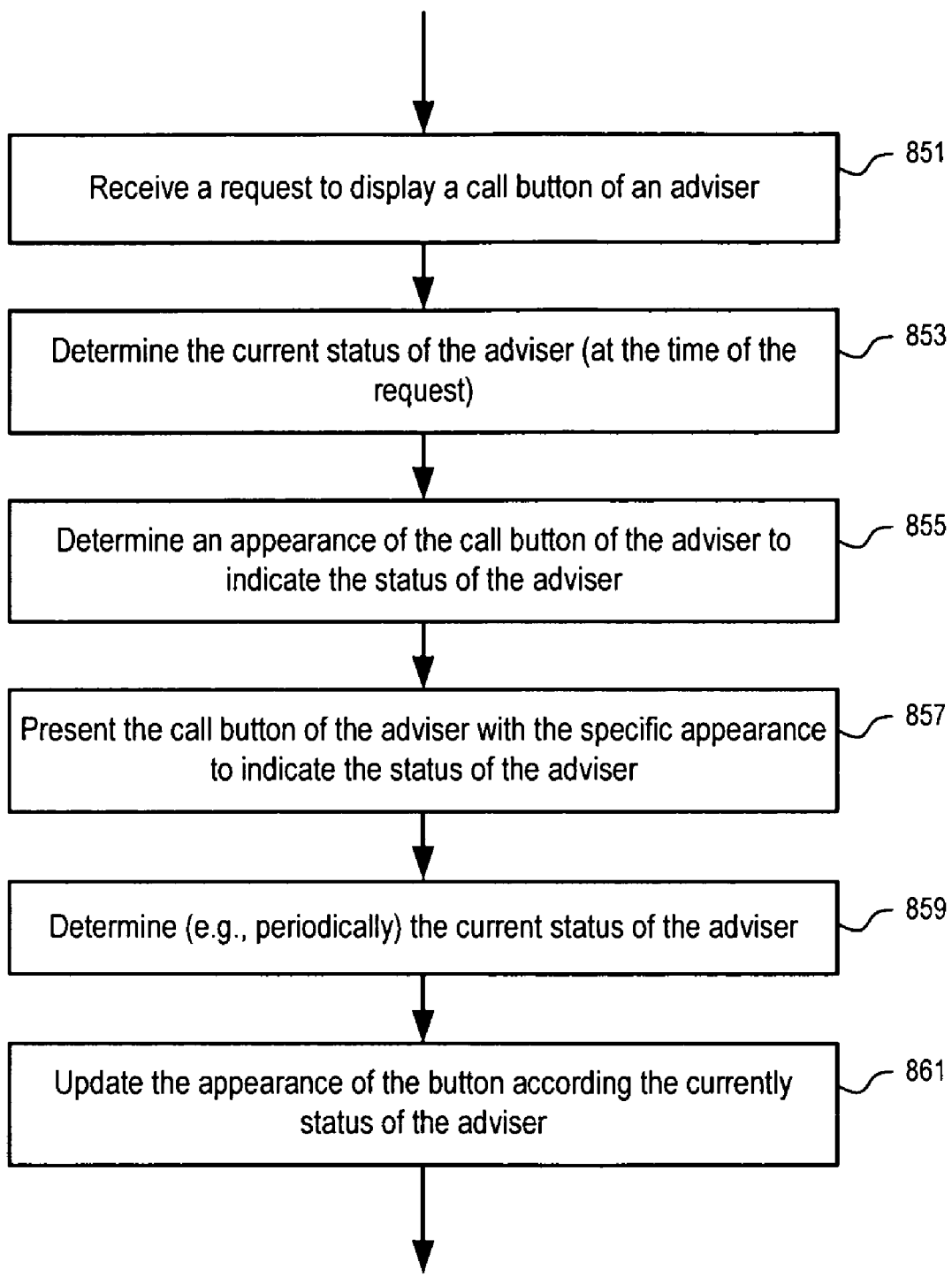
FIG. 13 illustrates a method to display a call button according to one embodiment of the present invention.

FIG. 13 illustrates a method to display a call button according to one embodiment of the present invention.

In one embodiment, the appearance of a call button is displayed according to the current availability status of the adviser to take the call.

For example, in FIG. 13, when the system receives (851) a request to display a call button of an adviser, the system determines (853) the current status of the adviser (at the time of the request). After the system determines (855) an appearance of the call button of the adviser to indicate the status of the adviser, the system presents (857) the call button of the adviser with the appearance to indicate the status of the adviser.

In one embodiment, the system further determines (859) (e.g., periodically) the current status of the adviser to update (861) the appearance of the button according the currently status of the adviser.

For example, the call button to be inserted in the blog of the callee can include an image at a URL on a server computer. When being requested the URL causes the server computer to determine a response based on the parameters encoded in the URL. For example, the URL can be pointing to a CGI (Common Gateway Interface) program which provides or generates the image according to the current status of the adviser. The URL may include a parameter to identify the adviser and/or the advertisement.

For example, when the current status of the adviser is "Taking Calls Now", the call button may show a telephone with text "Call Now"; when the current status of the adviser is "Taking Calls Shortly", the call button may show an off-hook telephone with text "Arrange a Call"; when the current status of the adviser is "Not Taking Calls for a While", the call button may show a telephone and a calendar with text "Appointment".

In one embodiment, different types of availability status of a callee (adviser) includes: on call, off call, busy, get in line, schedule an appointment, join conference, etc. It is understood that different systems may implement more or less types of availability status of a callee. Further, the call button may include other current status information about the callee, such as price, how many people are in line to call the callee, the schedule of the callee, and/or others.

In one embodiment, the call button is implemented using an applet running in the browser of the user. The applet displays the call button according to the current status of the adviser and checks the status of the adviser periodically to update the appearance of the button. In one embodiment, when an estimated time until which the adviser can take the call is available (e.g., received in the system from the adviser when the system attempts to contact the adviser, or provided by the adviser when the adviser is talking to a different user, etc.), the call button also shows an indication of such an estimated time to help the user in selecting a time window.

Alternatively, the call button may be implemented in custom applications (e.g., as plug-in to web browsers, email clients, etc., or as stand-along applications). The call button may communicate with the server using a special purpose protocol.

In one embodiment, a web/email (document) authoring tool is designed to automatically detect the phone number of the callee in a web page/email/document. The authoring tool can be set up to replace the phone number of the callee with the corresponding call button assigned to the callee and/or the phone number (e.g., ether phone number) that is assigned to the callee. For example, the authoring tool can detect the occurrence of the phone number of the callee in the document and prompt the user of the authoring tool to replace the phone number of the callee with the call button and/or the phone number assigned by the system. If the user accepts the suggestion, the authoring tool automatically replace the phone number of the callee with the call button and/or the phone number assigned by the system.

Figure 14:
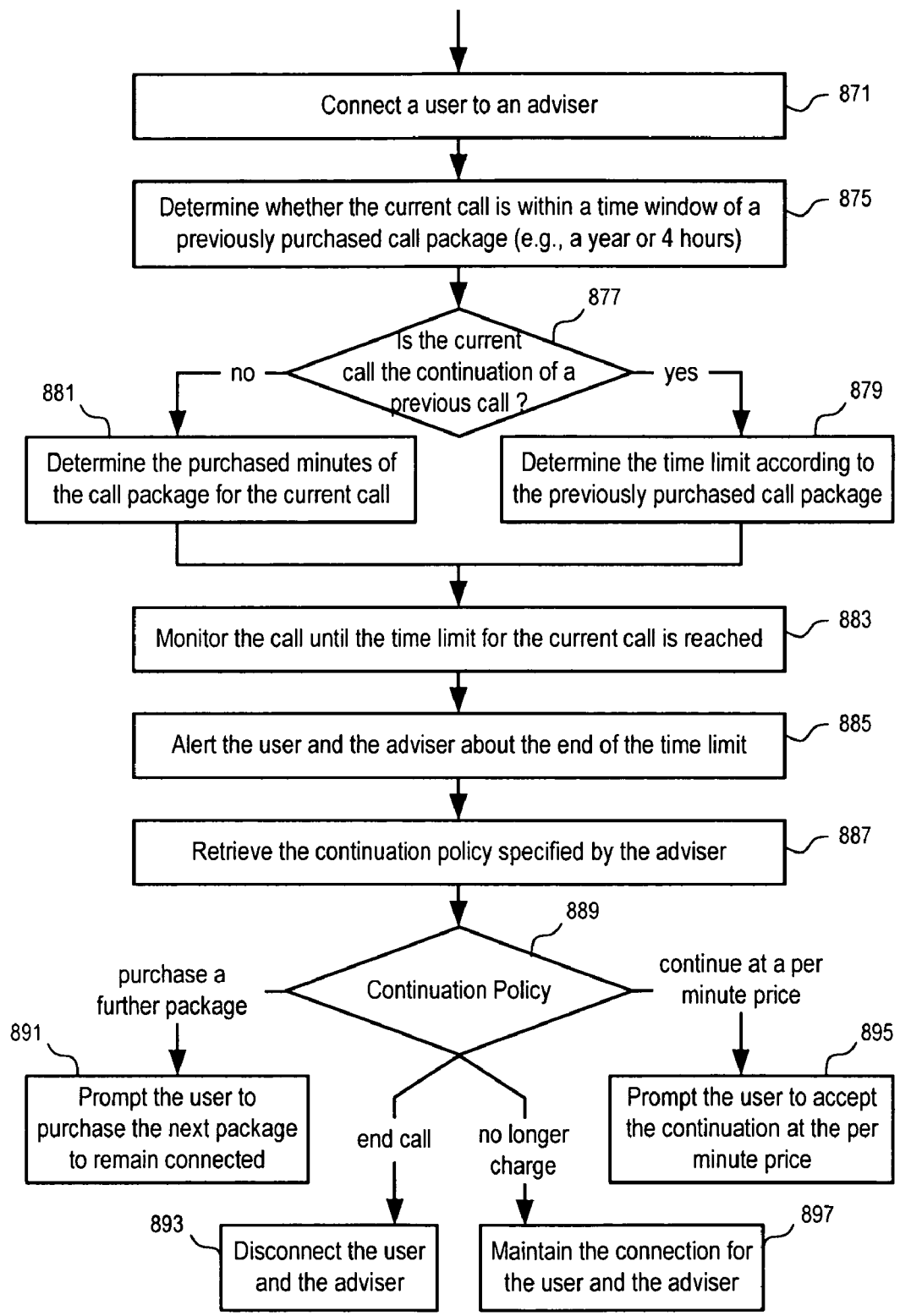
FIG. 14 illustrates a method to monitor and control a connection according to one embodiment of the present invention.

FIG. 14 illustrates a method to monitor and control a connection according to one embodiment of the present invention.

In FIG. 14, after the system connects (871) a user to an adviser, the system determines (875) whether the current call is within a time window of a previously purchased call package (e.g., a year or 4 hours).

In one embodiment, a call is considered a continuation of the previously purchased call package if the current call is within the time window. Thus, if the call of a previously purchased call package is interrupted, the user can continue the call within the time window without having to purchase another package.

Based on whether or not the current call is the continuation of a previous call (877), the system determines (879) the time limit according to the previously purchased call package, or determines (881) the purchased minutes of the call package for the current call. The system then monitors (883) the call until the time limit for the current call is reached. When the time limit for the call is reached, the system alerts (885) the user and the adviser about the end of the time limit.

In one embodiment, the continuation policy specified by the adviser is retrieved (887) to process the call at the end of the time limit.

If the continuation policy (889) is "purchase a further package", the system prompts (891) the user to purchase the next package to remain connected. For example, the user may be offered to continue the call at the price of $50 for another 30 minutes.

If the continuation policy (889) is "continue at a per minute price", the system prompts (895) the user to accept the continuation at the per minute price.

If the continuation policy (889) is "no longer charge", the system maintain (897) the connection for the user and the adviser until at least one of the user and the adviser hangs up.

If the continuation policy (889) is "end call", the system disconnects (893) the user and the adviser after altering the user and the adviser.

In one embodiment, the system stores a replication of the policy of the package the user purchased with the records of the purchased call (e.g., the policy at the time the call button is selected for the call package, or at the time the user is first connected to the adviser for the call package, or at the time the user explicitly confirms the purchase of the call package, etc.). Thus, the adviser is free to change the listing for the future callers even before the users finish the purchased call packages without retroactively affecting the purchased calls.

Some of the above examples are in the context of telephonic conversations. From this description, it will be understood that the techniques for connecting people for real time communications can also be applied to other types of communications, such as video and other multimedia channels, chat, instant messaging, document sharing, or screen-sharing, common "whiteboarding," interactive TV or internet TV, etc. Each of different multimedia channels can have different prices or be inclusive in one price (e.g., the use of part or all of the different channels can be included in the same price).

The real time communication may be on a one-to-one basis (e.g., one caller connected to one callee). The real time communication can also be in the form of one-to-many. For example, the seller may be hosting a conference in which multiple callers may attend. For example, 100 people can be in the same call or the same video session provided by the same seller.

Further, in one embodiment, the real time communication may include access to recorded sessions (e.g., recorded audio content and/or recorded video content).

Thus, the system on the whole may be used as a filter for sellers (callees), only letting in calls from people who are serious—they're serious because they have entered their credit card and are willing to pay. Celebrities can use the system. For example, people want to talk to the Oakland A's from the 70's, who are sitting on their porches these days. For example, Hollywood executives can use the system to hear pitches from scriptwriters who are willing to pay $1000 for the chance to pitch their script.

In one embodiment, these call buttons and the Ether phone numbers go to where the action is happening. In at least one embodiment of the present invention, it is recognized that not all service commerce will happen through marketplaces, such as keen.com or a search engine. People who want to talk to the Oakland A's players are more likely the visitor of the web site www.oaklandathletics.com—and that's where the call buttons can be very effective. And the Ether phone numbers can be in magazines, underneath photographs, in newspapers, on business cards, etc.

In one embodiment, the current status of the callee (e.g., availability, schedule, etc.) and guidance and instructions for the phone connection are provided through the appearance of the call button and the content of the call graphic. Alternatively or in combination, the status information, guidance and instructions can also be presented based using an interactive voice response (IVR) system.

For example, a talk radio station may have a guest on every day at a noon talk show. After the one-hour show, the radio announcer may say, "The time is up on our show. We've enjoyed talking with Dr. Webber and answering your calls. If you'd like to talk further with Dr. Webber, go to our website at WKBR.com and set up a conversation with him. Or, just dial the number 1-800-TALK-KBR and get in line. It's just $29 per 10-minute conversation."

In this example scenario, the phone number 1-800-TALK-KBR is assigned to Dr. Webber, which can be used to achieve many of the same goals as the call button assigned to Dr. Webber. While the button can visually communicate to the user the current (e.g., real-time) availability of the callee, the price, how many people are in line already, the schedule of the callee, etc., telephony prompts on a interactive voice response (IVR) system can also be used to provide such information after the caller dials the phone number that is assigned to the callee.

For example, in one embodiment, after a caller dials the phone number 1-800-TALK-KBR, the call is connected to a server, which determines that the call is for Dr. Webber since the phone number 1-800-TALK-KBR is assigned to (associated with) Dr. Webber. The server can then determine the current status of Dr. Webber, including the availability status, the price for the package, etc., and provide the information to the caller through the IVR system. In one embodiment, the server prompts options according to the current availability status of Dr. Webber. For example, the server may offer an immediate connection when Dr. Webber is available for immediate talk, or an opportunity to input a callback time window and/or callback phone number when Dr. Webber is expected to be available in a short period of time, or an opportunity to schedule an appointment with Dr. Webber when Dr. Webber is not expected to be available in a short period of time, etc. The server may use the IVR system to inform the caller the current status of the connection process and to provide instructions to the caller to take actions, such as providing a callback time window, providing an appointment time, providing an indication to accept the price of the call package, etc.

In one embodiment, the status information, instruction and guidance are provided using a combination of graphical presentations (e.g., over a graphical user interface terminal) and voice prompts (e.g., through an IVR system).

In one embodiment, the callee (seller) charges the caller(s) for the real time communication. The system provides the service to arrange and connect the call. The system can collect the payment from the caller(s), deduct a portion of the payment as fees to provide the service, and deliver the remaining payment to the callee (seller).

Alternatively, the callers may be not required to pay for the call; and the callee (e.g., advertisers) may pay the system for the service. In this case, the system may not provide the filtering functionality based on the willingness of the callers to pay. However, the callees (e.g., the advertisers) can still enjoy other benefits from the service provided by the system, such as call scheduling (no night calls), call queuing, toll-free number, local phone number, click-to-call, etc.

In one embodiment, the call buttons and the phone numbers assigned to the callees can also be published in advertisements in marketplaces, online or offline, on behalf of the callees; the callees bid for changes of the publicity and pay the bid amount on a per call basis for calls generated by the advertisements. When the callees generate the phone lead from their own media channel, the callees are only charged for a flat fee for the service of making the connection. Thus, in one embodiment, the system tracks the media channels that lead the caller to make the call.

Figure 15:
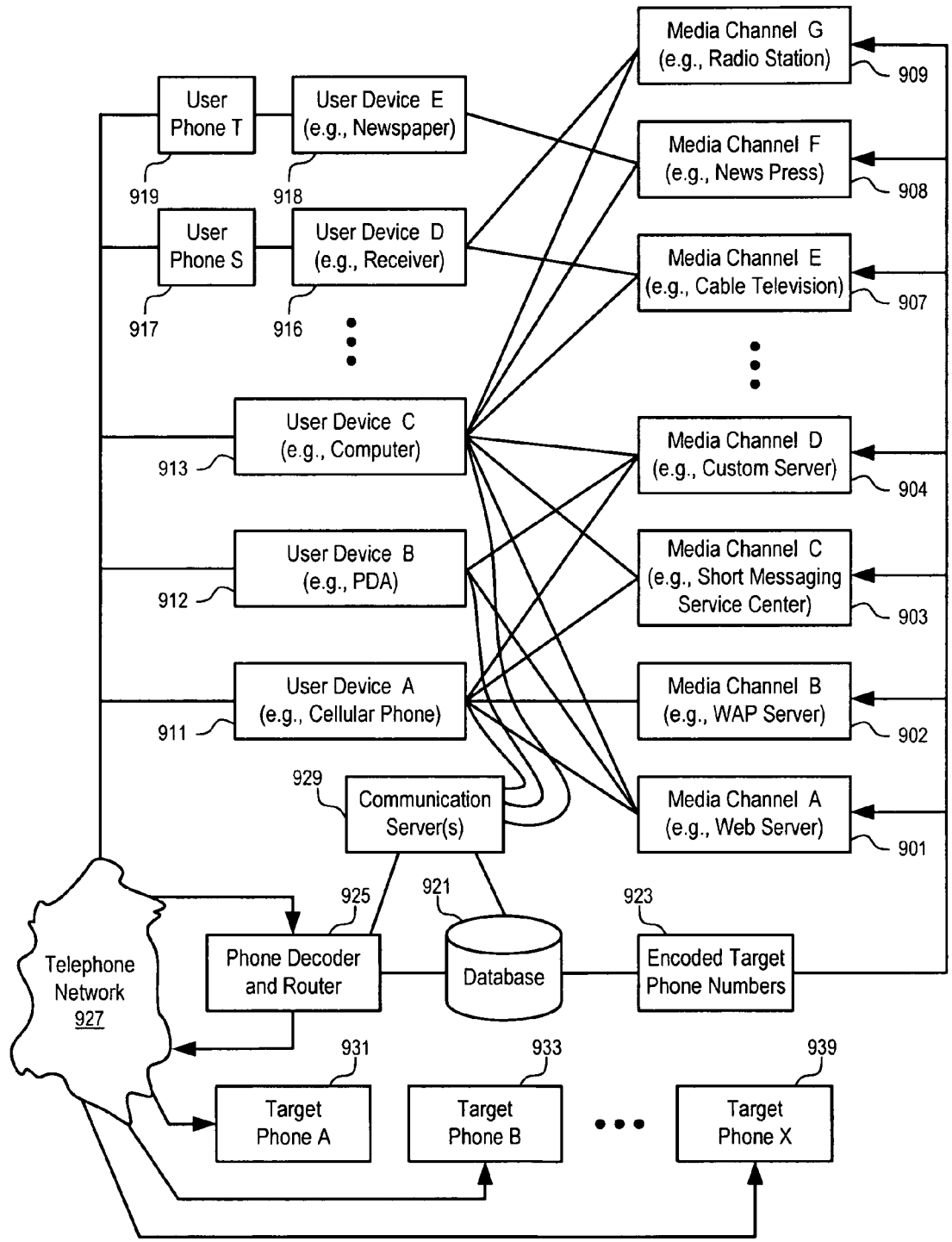
FIG. 15 shows a diagram of a system to assist and track connections according to one embodiment of the present invention.

FIG. 15 shows a diagram of a system to assist and track connections according to one embodiment of the present invention.

In FIG. 15, a database (921) may contain the phone numbers of target phone A (931), target phone B (933), . . . , target phone X (939), etc., of callees. Typically, the target phones belong to the institutions, businesses, individuals, etc., which seek for the services of embodiments of the present invention.

The call button and/or phone numbers assigned to the callees are distributed in various media channels, such as media channel A (901) (e.g., web server), media channel B (902) (e.g., WAP server), media channel C (903) (e.g., short messaging service center), media channel D (904) (e.g., custom server), media channel E (907) (e.g., cable television), media channel E (908) (e.g., news press), media channel G (909) (e.g., radio station), etc.

In one embodiment of the present invention, the call buttons and/or the assigned phone numbers, which can be considered as the encoded phone numbers of the callees, are presented in the environment specific to the callees, not in the marketplaces that are specially designed to advertise the callees. Thus, the callees generate the phone leads on their own media distributions, such as their web site or blog site.

Alternatively, or in combination, the call buttons and/or the assigned phone numbers can also be presented in marketplaces, such as in listings/directories of services, advertisements in search results, etc.

In one embodiment of the present invention, the phone numbers of the target phones are not directly publicized over the media channels. Instead, encoded target phone numbers (923) are used. Using the encoded target phone numbers (923), a user cannot reach target phones directly. Using the encoded target phone numbers (923), a user reaches a server of the system first, which allows the system to provide various services before actually connecting the user to the callee, such as filtering, payment processing, etc.

The encoded target phone numbers (923) allow the association of additional information with the target phone numbers, such as the media channels used, special promotions, etc.

The encoded target phone numbers and/or the call buttons are delivered with content information (e.g., web page, WAP page, short message, television programs, news articles, advertisement, blog, etc.) to user devices, such as user device A (911) (e.g., cellular phone), user device B (912) (e.g., personal digital assistant (PDA)), user device C (913) (e.g., computer), user device D (916) (e.g., receiver), user device E (918) (e.g., newspaper).

In one embodiment, a user device can include a USB phone, a Bluetooth wireless phone, or one or more speakers or headphones with one or microphones for the implementation of a software based phone.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, etc.).

In one embodiment, a user device is capable of dialing a phone call (e.g., automatically according to the encoded phone number embedded in the content information when a user selects the number). Alternatively, a user may manually dial a phone call using a separate phone, such as user phone S (917) or user phone T (919).

In one embodiment, a user device (e.g., 911, 912, 193) is capable of rendering the call button and sending a message to the communication server(s) (929) when the call button is activated. The call button includes an identifier of the callee so that when the call button is activated the user devices communicates the identifier of the callee to the server(s) (929).

In one embodiment, the user device (e.g., 911) is further capable of automatically identifying a phone number of the caller, or a VoIP identifier of the caller, as a callback number. Alternatively, the user device (e.g., 911, 912, 913) is capable of communicating with the server(s) (929) to present user interfaces to receive the callback number and other parameters, such as the callback time window.

In one embodiment of the present invention, dialing at least a portion of an encoded target phone number connects the phone call to a phone decoder and router (925) first. According to the encoded target phone number dialed, the phone decoder and router (925) determines the corresponding target phone number using the database (921) and connects the phone call to the corresponding target phone (e.g., one of target phones 931-939) through the telephone network (927).

Note the telephone network (927) may be circuit switched, package switched, or partially circuit switched and partially package switched. For example, the telephone network may partially use the Internet to carry the phone call (e.g., through VoIP). For example, the connection between the user phone/device and the phone decoder and router (925) may be carried using VoIP; and the connection between the phone decoder and router (925) may be carried using a land-line based, circuit switched telephone network.

In one embodiment of the present invention, the information associated with the encoded target phone number, such as the media channel used to provide the encoded target phone number to the users, is also decoded/retrieved using the database (921). Thus, the information associated with the encoded target phone number can be tracked/stored.

In one embodiment, the phone decoder and router (925) also determines the phone number of the user through Automatic Number Identification (ANI). ANI is a phone system feature that provides the billing number of the person making the phone call.

The information about the caller, target phone number, the media channel used for delivering the contact information to the user can be used to bill the caller and/or the target phone number, and provide credit/compensation for the corresponding media channel.

For example, the connection to target phone numbers can be paid for on a pay per call basis. Monitoring and tracking the calls can be used for billing the callee and/or the caller.

In one embodiment of the present invention, the additional information associated with the encoded target phone number is used to tracking phone calls for conditional promotions, electronic coupons, etc. Alternatively, the additional information for conditional promotions, electronic coupons, etc. are retrieved from the database of the listings at the time the corresponding call button is activated or presented, or at the time the encoded phone number is called.

The information about the media channels that are responsible for leading the users to the phone calls to the target phones can also be useful for the advisers. The advisers may wish to know which media channel is more effective in reaching users.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (925). In such an arrangement, a large number of encoded phone numbers are generally required to differentiate the different target phones and different media channels.

In one embodiment of the present invention, an encoded target phone number has more digits than a standard phone number (e.g., having an extension to the standard phone number). A first portion of the encoded target phone number has the same number of digits as a standard phone number to reach the phone decoder and router (925) through the telephone network (927); and a second portion of the encoded target phone number (e.g., the extension) is to be decoded by the phone decoder and router (925). For example, the Dual Tone Multi-Frequency (DTMF) decoder can be installed in the phone decoder and router (925) to detect the second portion of the encoded target phone number dialed at the user phone. The detected phone number can then be used to recover the target phone number.

In one embodiment of the present invention, a single telephone number is used to reach the phone decoder and router (925) for different target phone numbers; and the portion of the encoded target phone number that is used to reach the phone decoder and router (925) is not used in determining the information associated with the encoded target phone number.

Alternatively, multiple telephone numbers can be used to reach the phone decoder and router (925); and the entire encoded target phone number can be used to determine the information associated with the encoded target phone number.

In one embodiment of the present invention, the encoded target phone numbers can have different numbers of digits. The callees may be arranged to bid for shorter encoded target phone numbers.

In one embodiment, a look-up table approach is used to encode the information. For example, the database (921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of field separated by "*" or "#". Each of the field can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (925). When such a mapping scheme is used, a look up table is not necessary. For example, an encoded target phone number may include a first portion that is the phone number of the phone decoder and router (925), a second portion that is the target phone number appended with other parameters. To prevent revealing the target phone number and the parameters, an encryption/scrambling scheme can be used to encode the second portion, which is decoded at the phone decoder and router (925).

In one embodiment, the phone decoder and router (925) determines the target phone number from the encoded target phone number dialed by the user and then dials the target phone number for the user and joins the phone calls so that the user can talk to the target phone.

In one embodiment, the communication server(s) (929) determines the target phone number from the message sent from the user devices when the call button is pressed.

In one embodiment of the present invention, users dial the encoded target phone numbers manually. A user can dial the encoded target phone number regardless the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number. Alternatively, the system initiates the VoIP connection to the user device after receiving the message from the user device requesting the phone connection.

In one embodiment of the present invention, the user device dials the phone number for the user without the user manually press the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (925), pauses for a short period of time for the phone decoder and router (925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 15, the user device initiates the phone call. Alternatively, a phone router may be used to initiate phone calls both to the user device (or a separate user phone) and the target phone and then join the phone calls to connect the user to the target phone. For example, when the user selects the call button, the encoded target phone number is transmitted to the communication server(s) (929), which can instruct the phone decoder and router (925) to initiate the phone calls.

The user phone number can be automatically determined through ANI, or through a user preference setting, or through an entry submitted with the selection of the encoded target phone number (e.g., the call button).

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

Figure 16:
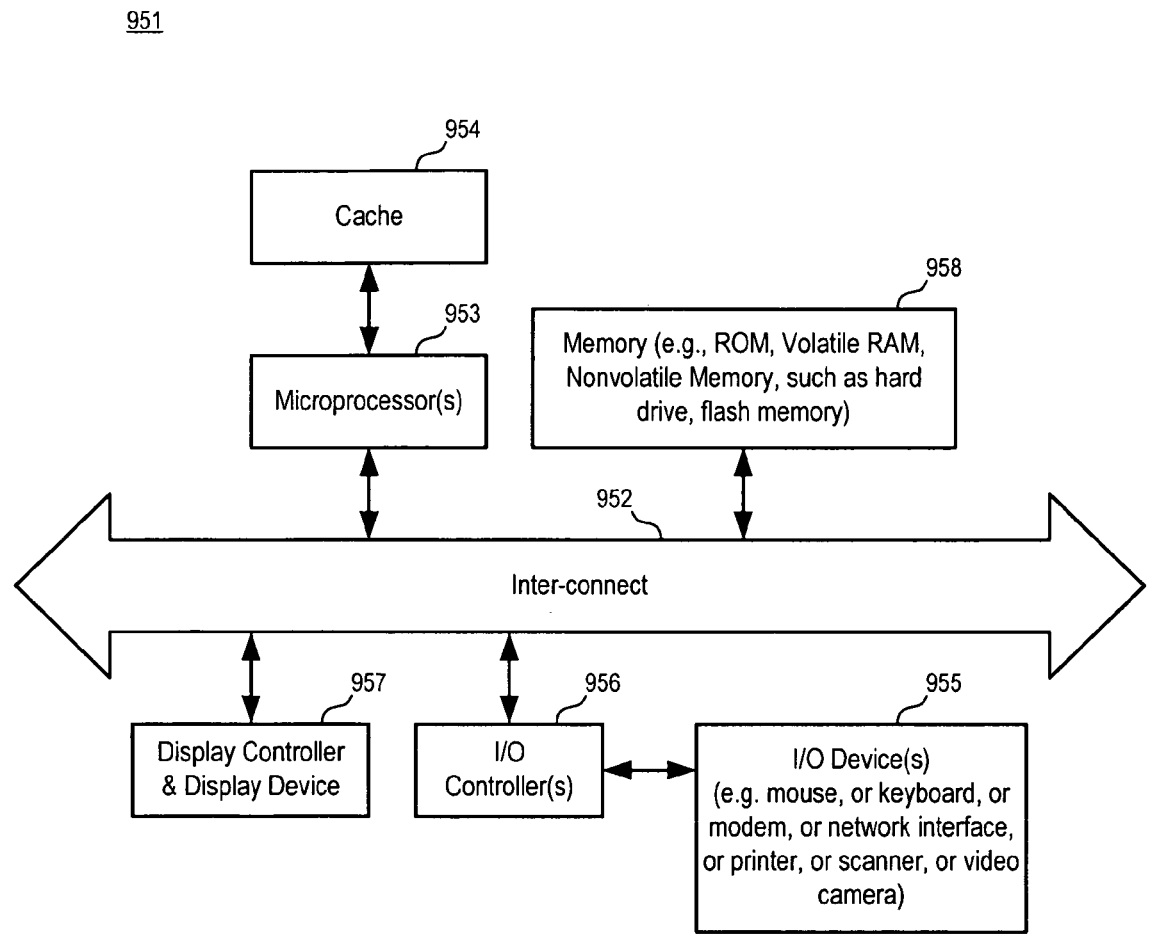
FIG. 16 shows a block diagram example of a data processing system which may be used with the present invention.

FIG. 16 shows a block diagram example of a data processing system which may be used with the present invention.

While FIG. 16 illustrates various components of a computer system, it is not intended to represent any particular architecture or manner of interconnecting the components. Other systems that have fewer or more components may also be used with the present invention.

In FIG. 16, the communication device (951) is a form of a data processing system. The system (951) includes an inter-connect (952) (e.g., bus and system core logic), which interconnects a microprocessor(s) (953) and memory (958). The microprocessor (953) is coupled to cache memory (954) in the example of FIG. 16.

The inter-connect (952) interconnects the microprocessor(s) (953) and the memory (958) together and also interconnects them to a display controller and display device (957) and to peripheral devices such as input/output (I/O) devices (955) through an input/output controller(s) (956). Typical I/O devices include mice, keyboards, modems, network interfaces, printers, scanners, video cameras and other devices which are well known in the art.

The inter-connect (952) may include one or more buses connected to one another through various bridges, controllers and/or adapters. In one embodiment the I/O controller (956) includes a USB (Universal Serial Bus) adapter for controlling USB peripherals, and/or an IEEE-1394 bus adapter for controlling IEEE-1394 peripherals.

The memory (958) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a server data processing system as illustrated in FIG. 16 is used as one of the communication server(s) (e.g., 929, 925, and/or 921 in FIG. 15).

Further, a user terminal as a client system can be a data processing system similar to the system of FIG. 16. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

Alternatively, the traditional communication client(s) may be used in some embodiments of the present invention.

From this description, it will be appreciated that certain aspects of the invention are embodied in the user devices, certain aspects of the invention are embodied in the server systems, and certain aspects of the invention are embodied in a system as a whole.

Embodiments of the present invention can be implemented using hardware, programs of instruction, or combinations of hardware and programs of instructions.

In general, routines executed to implement the embodiments of the invention may be implemented as part of an operating system or a specific application, component, program, object, module or sequence of instructions referred to as "computer programs. The computer programs typically comprise one or more instructions set at various times in various memory and storage devices in a computer, and that, when read and executed by one or more processors in a computer, cause the computer to perform operations necessary to execute elements involving the various aspects of the invention.

While some embodiments of the invention have been described in the context of fully functioning computers and computer systems, those skilled in the art will appreciate that various embodiments of the invention are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods of the present invention. The executable software and data may be stored in various places including for example ROM, volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects of the present invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   receiving, in an application running in a client computer, an object from a remote connection service system serving a callee, the object embedded in a web page and including a reference to the remote connection service system and the callee, wherein the client computer can be coupled to the remote connection service system via a network;
   communicating, via the client computer, with one of the remote connection service system and the callee utilizing the reference to the remote connection service system and the callee to determine a first appearance of the object at a time to render the web page to show the object that is received from the remote connection service system as part of the web page;
   rendering, using the application, the object to show the object in the first appearance in the web page to identify a state of the callee for accepting a request for real time communication;
   receiving a selection of the object in the web page to at least initiate a request for real time communication with the callee, if the first appearance of the object indicates that the callee is available to accept a request for real time communication; and
   presenting a user interface to set up a call to the callee according to a current state of the callee for accepting the request in response to a user selection of the object, the user interface present presenting one of an option to make an appointment and an option to accept callback in a period of time;
   wherein:
   when the callee is currently available to take the call, the user interface does not present an option to make an appointment; and
   when the callee is not available for a predetermined period of time, the user interface does not present an option to accept callback.

2. The method of claim 1, wherein communicating comprises:
   receiving a parameter indicating the state of the callee;
   wherein the object is rendered in the first appearance according to the parameter.

3. The method of claim 1, wherein a representation of the object comprises instructions which when executed render the user interface.

4. The method of claim 1, further comprising:
   receiving instructions from the remote connection service system for rendering the user interface in response to the user selection of the object.

5. The method of claim 1, further comprising:
   updating rendering of the object based on a current state of the callee for accepting the request for real time communication.

6. The method of claim 1, wherein receiving comprises:
   receiving a representation of the object in a further web page from a system different from the remote connection service system;
   wherein the further web page is a blog of the callee.

7. The method of claim 1, wherein receiving comprises:
   receiving a representation of the object in a document in a context related to the callee.

8. The method of claim 1, wherein rendering the object comprises:
   rendering a representation of the object outside of a market designated for a set of callees.

9. The method of claim 1, wherein a representation of the object comprises one of: an applet, and a reference to an application on the remote connection service system.

10. A method, comprising:
    receiving, in a web server running in a server computer, a reference to a callee from a remote connection service system serving as a connection service for the callee, in response to a web page containing an object being rendered in a web browser running on the remote connection service system, the object containing the reference to the callee and a reference to the remote connection service system;
    determining, via the remote connection service system, a state of the callee for accepting a request for real time communication, using the reference to the callee;
    communicating, via the remote connection service system, with the server computer to determine an appearance of the object at a time of rendering of the web page that contains the object, the appearance of the object indicating the state of the callee for accepting the request for real time communication, the object selectable in the web page to at least initiate the request for real time communication with the callee; and
    presenting, via the remote connection service system, a user interface to set up a call to the callee according to a current state of the callee for accepting the request in response to a user selection of the object, the user interface presenting one of an option to make an appointment and an option to accept callback in a period of time;
    wherein:
    when the callee is currently available to take the call, the user interface does not present an option to make an appointment; and
    when the callee is not available for a predetermined period of time, the user interface does not present an option to accept callback.

11. The method of claim 10, further comprising:
    receiving, via the remote connection service system, an indication of a current state of the callee for accepting the request from the callee; and
    storing in a storage medium information to indicate the state of the callee for accepting the request according to the indication.

12. The method of claim 11, wherein the receiving the indication comprises:
receiving the indication of a current state of the callee for accepting the request through an interactive voice response system from the callee.

13. The method of claim 11, further comprising:
communicating with the remote system to update rendering of the object in response to receiving the indication from the callee;
wherein receiving the indication comprises receiving the indication of a current state of the callee for accepting the request through a further web site from the callee.

14. A method in a client application, comprising:
receiving, via a client computer, a web page containing a representation of a button, the representation including a reference to a remote connection service server, serving a callee, and a reference to the callee;
at a time to render the web page, communicating, via the client computer, with the remote connection service server, using one of the reference to the remote connection service server and the reference to the callee, to determine a first appearance of the button based on a current availability state of the callee for accepting a request for real time telephonic communication; and
rendering, via the client computer, the button in the first appearance in the web page, the button being selectable to make the request for real time telephonic communication with the callee; and
presenting, via the remote connection service server, a user interface to set up a call to the callee according to a current state of the callee for accepting the request in response to a user selection of the button, the user interface presenting one of an option to make an appointment and an option to accept callback in a period of time;
wherein:
when the callee is currently available to take the call, the user interface does not present an option to make an appointment; and
when the callee is not available for a predetermined period of time, the user interface does not present an option to accept callback.

15. The method of claim 14, wherein communicating comprises:
receiving a first image from the remote connection service server, the first image providing the button with the first appearance.

16. The method of claim 14, wherein communicating comprises:
receiving a parameter indicating the first appearance from the remote server;
wherein the button is rendered in the first appearance according to the parameter.

17. A method comprising:
receiving, via a connection service server computer, serving a callee, a reference to the callee from a remote client, in response to a web page containing a button being rendered in the remote client, the button including a reference to the connection service server computer and the reference to the callee;
determining, via the connection service server computer, a current availability state of the callee for accepting a request for real time telephonic communication using the reference to the callee;
communicating, via the connection service server computer, with the remote client to determine a first appearance of the button at a time of rendering the web page, based on the current availability state of the callee, the button to be rendered in the first appearance in the web page and selectable to make the request for real time telephonic communication with the callee; and
presenting, via the connection service server computer, a user interface to set up a call to the callee according to a current state of the callee for accepting the request in response to a user selection of the button, the user interface presenting one of an option to make an appointment and an option to accept callback in a period of time;
wherein:
when the callee is currently available to take the call, the user interface does not present an option to make an appointment; and
when the callee is not available for a predetermined period of time, the user interface does not present an option to accept callback.

18. A method, comprising:
providing, via a connection service server computer, responsive to a first request from a callee, a communication reference to the callee for distribution by the callee via a web page to allow people to reach the callee for real time communication, the communication reference identifying the connection service server computer and being associated with the callee;
determining, via the connection service server computer, responsive to a second request generated by a caller using the communication reference distributed by the callee via the web page, a current availability state of the callee for real time communication;
providing information to the caller according to the current availability state of the callee; and
presenting, via the connection service server computer, a user interface to set up a call to the callee according to a current state of the callee for accepting the request in response to a user selection of the communication reference, the user interface presenting one of an option to make an appointment and an option to accept callback in a period of time;
wherein:
when the callee is currently available to take the call, the user interface does not present an option to make an appointment; and
when the callee is not available for a predetermined period of time, the user interface does not present an option to accept callback.

19. The method of claim 18, wherein the communication reference comprises a representation of a button; wherein the information is provided before the button is activated to request a communication connection between the caller and the callee.

20. The method of claim 18, wherein the communication reference comprises a representation of a button; wherein the information is provided responsive to the button being displayed.

21. The method of claim 18, wherein the communication reference comprises a telephone number of the connection service server computer; wherein the information is provided responsive to a telephone call to the telephone number.

22. The method of claim 18, wherein the communication reference is distributed by the callee to the caller.

23. The method of claim 18, wherein the information includes the current availability state of the callee.

* * * * *